US011224867B2

(12) United States Patent
McGuire et al.

(10) Patent No.: US 11,224,867 B2
(45) Date of Patent: Jan. 18, 2022

(54) PROCESS FOR PREPARING A ZEOLITIC MATERIAL HAVING FRAMEWORK TYPE AEI

(71) Applicant: BASF Corporation, Florham Park, NJ (US)

(72) Inventors: Robert McGuire, Florham Park, NJ (US); Ahmad Moini, Iselin, NJ (US); Ulrich Mueller, Ludwigshafen am Rhein (DE)

(73) Assignee: BASF Corporation, Florham Park, NJ (US)

( * ) Notice: Subject to any disclaimer, the term of this patent is extended or adjusted under 35 U.S.C. 154(b) by 94 days.

(21) Appl. No.: 16/605,133

(22) PCT Filed: May 15, 2018

(86) PCT No.: PCT/EP2018/062518
§ 371 (c)(1),
(2) Date: Oct. 14, 2019

(87) PCT Pub. No.: WO2018/210809
PCT Pub. Date: Nov. 22, 2018

(65) Prior Publication Data
US 2021/0016262 A1   Jan. 21, 2021

(30) Foreign Application Priority Data

May 15, 2017   (EP) .................................. 17171040

(51) Int. Cl.
*C01B 39/48* (2006.01)
*B01J 29/70* (2006.01)
(Continued)

(52) U.S. Cl.
CPC ...... *B01J 29/7065* (2013.01); *B01D 53/9418* (2013.01); *C01B 39/026* (2013.01);
(Continued)

(58) Field of Classification Search
CPC .... C01B 39/026; C01B 39/48; B01J 29/7065; B01J 2229/186; B01J 2229/42; B01D 53/9418; B01D 2255/50
See application file for complete search history.

(56) References Cited

U.S. PATENT DOCUMENTS 10,035,141 B2 *  7/2018  Sano ..................... C01B 39/48
10,202,323 B2    2/2019  Parvulescu et al.
(Continued)

FOREIGN PATENT DOCUMENTS

CA         2855572 A1     5/2013
CA       2 875 700 A1    12/2013
(Continued)

OTHER PUBLICATIONS

Mauro et al, "Facile Synthesis of AEI Zeolites by Hydrothermal Conversion of FAU Zeolites in the Presence of Tetraethylphosphonium Cations", Chem. Lett. 2014, 43, 302-304 | doi: 10.1246/cl.130996 (Year: 2013).*
(Continued)

*Primary Examiner* — David M Brunsman
(74) *Attorney, Agent, or Firm* — Finnegan, Henderson, Farabow, Garrett & Dunner LLP

(57) ABSTRACT

A process for preparing a zeolitic material having framework type AEI and having a framework structure which comprises a tetravalent element Y, a trivalent element X, and oxygen, said process comprising (i) providing a zeolitic material having framework type CHA and having a framework structure comprising the tetravalent element Y, the trivalent element X, and oxygen; (ii) preparing a synthesis mixture comprising the zeolitic material provided in (i), water, a source of the tetravalent element Y other than the zeolitic material provided in (i), and an AEI framework structure directing agent; (iii) subjecting the synthesis mixture prepared in (ii) to hydrothermal synthesis conditions
(Continued)

comprising heating the synthesis mixture to a temperature in the range of from 100 to 200° C. and keeping the synthesis mixture at a temperature in this range under autogenous pressure, obtaining the zeolitic material having framework type AEI; wherein Y is one or more of Si, Ge, Sn, Ti, Zr; wherein X is one or more of Al, B, Ga, In; wherein in the framework structure of the zeolitic material provided in (i), the molar ratio Y:X, calculated as $YO_2 : X_2O_3$, is at most 20:1 and, wherein; the process further comprises supporting a metal M selected from the transition metals of groups 7 to 12 of the periodic system of elements.

14 Claims, 12 Drawing Sheets

(51) Int. Cl.
  *B01D 53/94* (2006.01)
  *C01B 39/02* (2006.01)
(52) U.S. Cl.
  CPC .......... *C01B 39/48* (2013.01); *B01D 2255/50* (2013.01); *B01D 2258/012* (2013.01); *B01J 2229/186* (2013.01); *B01J 2229/42* (2013.01)

(56) References Cited

U.S. PATENT DOCUMENTS

| | | | |
|---|---|---|---|
| 10,435,381 | B2 | 10/2019 | Teles et al. |
| 10,870,583 | B2 * | 12/2020 | McGuire .............. B01J 35/1066 |
| 2005/0197519 | A1 * | 9/2005 | Cao .......................... C01B 37/02 585/640 |
| 2014/0271426 | A1 | 9/2014 | Casci et al. |
| 2015/0238947 | A1 | 8/2015 | Casci et al. |
| 2018/0093895 | A1 | 4/2018 | Canos et al. |
| 2018/0250663 | A1 | 9/2018 | Hotta et al. |

FOREIGN PATENT DOCUMENTS

| | | |
|---|---|---|
| WO | WO 2005/063624 A1 | 7/2005 |
| WO | WO 2013/068976 A | 5/2013 |
| WO | WO 2013/182974 A | 12/2013 |
| WO | WO 2016/166245 A1 | 10/2016 |
| WO | WO 2017/090382 A1 | 6/2017 |

OTHER PUBLICATIONS

Dusselier et al, "Methanol-to-Olefins Catalysis with Hydrothermally Treated Zeolite SSZ-39", ACS Catal. 2015, 5, 6078-6085 (Year: 2015).*
Jiao et al., "Dual template synthesis of SAPO-18/34 zeolite intergrowths and their perfomances in direct conversion of syngas to olefines", Microporous and Mesoporous Materials 306 (2020) 110444 (Year: 2020).*
U.S. Appl. No. 15/264,428, filed Sep. 13, 2016, US 2017/0362513 A1, Robert McGuire, et al.
U.S. Appl. No. 15/752,991, filed Feb. 15, 2018, US 2018/0243691 A1, Ulrich Mueller, et al.
U.S. Appl. No. 15/779,218, filed May 25, 2018, US 2018/0345245 A1, Stefan Maurer, et al.
U.S. Appl. No. 16/086,251, filed Sep. 18, 2018, Benedikt Kalo.
U.S. Appl. No. 15/779,314, filed May 25, 2018, US 2018/0333696 A1, Julia Burckhart, et al.
U.S. Appl. No. 16/060,260, filed Jun. 7, 2018, US 2018/0362353 A1, Nicolas Vautravers, et al.
U.S. Appl. No. 16/076,600, filed Aug. 8, 2018, US 2019/0077779 A1, Dominic Riedel, et al.
U.S. Appl. No. 16/321,252, filed Aug. 28, 2019, US 2019/0169037 A1, Natalia Trukhan, et al.
U.S. Appl. No. 16/349,364, filed May 13, 2019, US 2019/0367377 A1, Andrei-Nicolae Parvulescu, et al.
U.S. Appl. No. 16/461,134, filed May 15, 2019, Andrei-Nicolae Parvulescu, et al.
U.S. Appl. No. 16/470,834, filed Jun. 18, 2019, Andrei-Nicolae Parvulescu, et al.
U.S. Appl. No. 16/462,430, filed May 20, 2019, US 2019/0321811 A1, Andrei-Nicolae Parvulescu, et al.
U.S. Appl. No. 16/308,730, filed Dec. 10, 2018, US 2019/0143272 A1, Natalia Trukhan, et al.
U.S. Appl. No. 15/775,657, filed May 11, 2018, US 2018/0328601 A1, Matthias Weickert, et al.
U.S. Appl. No. 16/060,739, filed Jun. 8, 2018, US 2018/0362357 A1, Mathias Feyen, et al.
U.S. Appl. No. 16/462,408, filed May 20, 2019, US 2019/0366313 A1, Robert Mcguire, et al.
U.S. Appl. No. 16/060,229, filed Jun. 7, 2018, US 2018/0362351 A1 Andrei-Nicolae Parvulescu, et al.
U.S. Appl. No. 16/315,345, filed Jan. 4, 2019, US 2019/0322634 A1, Joaquim Henrique Teles, et al.
U.S. Appl. No. 16/315,680, filed Jan. 7, 2019, US 2019/0210989 A1, Joaquim Henrique Teles, et al.
U.S. Appl. No. 16/310,645, filed Dec. 17, 2018, US 2019/0330171 A1, Andrei-Nicolae Parvulescu, et al.
U.S. Appl. No. 16/304,511, filed Nov. 26, 2018, US 2019/0134564 A1, Mathias Feyen, et al.
U.S. Appl. No. 16/463,263, filed May 22, 2019, US 2019/0300375 A1, Robert Mcguire, et al.
U.S. Appl. No. 16/469,782, filed Jun. 14, 2019, Marie Katrin Schroeter, et al.
U.S. Appl. No. 16/308,928, filed Dec. 11, 2018, US 2019/0144290 A1, Stefan Marx et al.
U.S. Appl. No. 16/372,801, Apr. 2, 2019, US 2019/0225500 A1, Eduard L. Kunkes, et al.
U.S. Appl. No. 16/464,894, filed May 29, 2019, US 2019/0389794 A1, Andrei-Nicolae Parvulescu, et al.
U.S. Appl. No. 16/464,943, filed May 29, 2019, US 2019/0308928 A1, Andrei-Nicolae Parvulescu, et al.
U.S. Appl. No. 16/464,966, filed May 29, 2019, US 2019/0308929 A1, Andrei-Nicolae Parvulescu, et al.
U.S. Appl. No. 16/330,592, filed Mar. 5, 2019, Andrei-Nicolae Parvulescu, et al.
U.S. Appl. No. 16/467,716, filed Jun. 7, 2019, US 2020/0010331 A1, Eduard L. Kunkes, et al.
U.S. Appl. No. 16/607,514, filed Apr. 24, 2018, Robert Mcguire.
U.S. Appl. No. 16/607,532, filed Apr. 24, 2018, Robert Mcguire.
U.S. Appl. No. 16/336,661, filed Mar. 26, 2019, Andrei-Nicolae Parvulescu.
U.S. Appl. No. 16/488,962, filed Aug. 27, 2019, Andrei-Nicolae Parvulescu, et al.
U.S. Appl. No. 16/605,069, filed Oct. 14, 2019, Ahmad Moini, et al.
U.S. Appl. No. 16/485,291, filed Aug. 12, 2019, US 2019/0375724 A1, Alvaro Gordillo, et al.
U.S. Appl. No. 16/500,313, filed Oct. 2, 2019, filed Nicolai T. Woerz, et al.
U.S. Appl. No. 16/495,574, filed Sep. 19, 2019, Wen-Mei Xue, et al.
U.S. Appl. No. 16/485,077, filed Aug. 9, 2019, US 2019/0358613 A1, Stefa Ernst.
U.S. Appl. No. 16/610,131, filed Nov. 1, 2019, Alvaro Gordillo, et al.
International Search Report and Written Opinion of the International Searching Authority dated Jun. 8, 2018 in PCT/EP2018/062518 filed May 15, 2018, 18 pages.
International Preliminary Report on Patentability dated Nov. 19, 2019 in PCT/EP2018/062518 filed May 15, 2018, 10 pages.
Ian C. Madsen, et al. "Quantitative Phase Analysis" in: Dinnebier, R. E., Billinge S. J. L. (eds) "Powder Diffraction: Theory and Practice" The Royal Society of Chemistry, Cambridge, 2008, pp. 298-331.
Nuria Martin et al., "Efficient Synthesis of the Cu-SSZ-39 Catalyst for DeNOx Applications" Chemical Communications—Chemcom., vol. 51, No. 55, XP055260185, Jun. 2, 2015, pp. 11030-11033.

(56) References Cited

OTHER PUBLICATIONS

Takushi Sonoda et al.; "Synthesis of High-Silica AEI Zeolites with Enhanced Thermal Stability by Hydrothermal conversion of FAU Zeolites, and their Activity in the Selective Catalytic Reduction of $NO_x$ with $NH_3$" Journal of Materials Chemistry A, vol. 3, No 2, XP055179309 Jun. 13, 2014. pp. 857-865.

\* cited by examiner

PROCESS FOR PREPARING A ZEOLITIC MATERIAL HAVING FRAMEWORK TYPE AEI

This application is a 371 of PCT/EP2018/062518, filed May 15, 2018.

The present invention relates to a process for preparing a zeolitic material having framework type AEI and having a framework structure which comprises a tetravalent element Y, a trivalent element X, and oxygen. Further, the present invention relates to a zeolitic material having framework type AEI and having a framework structure which comprises a tetravalent element Y, a trivalent element X, and oxygen, obtainable or obtained by said process, and further relates to the use of said zeolitic material as a catalytically active material, as a catalyst, or as a catalyst component.

Zeolitic materials having framework type AEI are known to be potentially effective as catalysts or catalyst components for treating combustion exhaust gas in industrial applications, for example for converting nitrogen oxides ($NO_x$) in an exhaust gas stream. Synthetic AEI zeolitic materials generally produced by precipitating crystals of the zeolitic material from a synthesis mixture which contains the sources of the elements from which the zeolitic framework is built, such as a source of silicon and a source of aluminum. An alternative approach may be the preparation via zeolitic framework conversion according to which a starting material which is a suitable zeolitic material having a framework type other than AEI is suitably reacted to obtain the zeolitic material having framework type AEI.

According to the present invention it was found that if for such a conversion, a zeolitic material having framework type CHA is employed, not every CHA material is suitable. Therefore, it was an object of the present invention to find suitable zeolitic materials having framework type CHA which can be employed for preparing a zeolitic material having framework type AEI. Surprisingly, it was found that whether or not said zeolitic materials having framework type CHA can be used depends on the composition of the framework of the zeolitic materials having framework type CHA.

Therefore, the present invention relates to a process for preparing a zeolitic material having framework type AEI and having a framework structure which comprises a tetravalent element Y, a trivalent element X, and oxygen, said process comprising:
(i) providing a zeolitic material having framework type CHA and having a framework structure comprising the tetravalent element Y, the trivalent element X, and oxygen;
(ii) preparing a synthesis mixture comprising the zeolitic material provided in (i), water, a source of the tetravalent element Y other than the zeolitic material provided in (i), and an AEI framework structure directing agent;
(iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
wherein Y is one or more of Si, Ge, Sn, Ti, Zr;
wherein X is one or more of Al, B, Ga, In;
wherein in the framework structure of the zeolitic material provided in (i), the molar ratio Y:X, calculated as $YO_2:X_2O_3$, is at most 20:1.

Preferably, the framework structure comprises the tetravalent element Y, the trivalent element X, oxygen, and H. Preferably, Y is Si. Preferably, X is Al. More preferably, Y is Si and X is Al.

In addition to the tetravalent element Y, the trivalent element X, and oxygen, and preferably H, the zeolitic material having framework type CHA provided in (i) may comprise one or more further additional components. Preferably at least 95 weight-%, more preferably at least 98 weight-%, more preferably at least 99 weight-%, more preferably at least 99.5 weight-% of the framework of the zeolitic material provided in (i) consist of Y, X, O, and H.

Preferably, the zeolitic material provided in (i) does not comprise Cu. In particular in case a non-naturally occurring zeolitic material is provided in (i), the zeolitic material provided in (i) preferably does not comprise one or more of Cu and Fe, more preferably does not comprise one or more of Fe, Co, Ni, Cu, and Zn, more preferably does not comprise a metal M other than Y and X if Y or X is a metal. Preferably, the content of the zeolitic material having framework type CHA provided in (i) with regard to Cu, calculated as element, is at most 500 weight-ppm, preferably at most 100 weight-ppm, based on the total weight of the zeolitic material. In particular in case a non-naturally occurring zeolitic material is provided in (i), the content of the zeolitic material having framework type CHA provided in (i) with regard to one or more of Cu and Fe, each calculated as element, more preferably with regard to one or more of Fe, Co, Ni, Cu, and Zn, each calculated as element, more preferably with regard to a metal M, calculated as element, other than Y and X if Y or X is a metal, is at most 500 weight-ppm, preferably at most 100 weight-ppm, based on the total weight of the zeolitic material.

In the zeolitic material having framework type CHA provided in (i), the molar ratio Y:X, calculated as $YO_2:X_2O_3$, is preferably in the range of from 3:1 to 20:1, preferably in the range of from 4:1 to 15:1, more preferably in the range of from 5:1 to 10:1. Preferred ranges are, for example, from 5:1 to 7:1 or from 6:1 to 8:1 or from 7:1 to 9:1 or from 8:1 to 10:1.

Therefore, the present invention preferably relates to a process for preparing a zeolitic material having framework type AEI and having a framework structure which comprises a tetravalent element Y, a trivalent element X, and oxygen, preferably the process as described hereinabove, said process comprising
(i) providing a zeolitic material having framework type CHA and having a framework structure comprising the tetravalent element Y, the trivalent element X, and oxygen;
(ii) preparing a synthesis mixture comprising the zeolitic material provided in (i), water, a source of the tetravalent element Y other than the zeolitic material provided in (i), and an AEI framework structure directing agent;
(iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
wherein Y is Si;
wherein X is Al;
wherein in the framework structure of the zeolitic material provided in (i), the molar ratio Y:X, calculated as $YO_2:X_2O_3$, is in the range of from 5:1 to 10:1.

In the context of the present invention, the zeolitic material having framework type CHA provided in (i) is preferably a calcined zeolitic material, more preferably a zeolitic material having been calcined in a gas atmosphere at a temperature of the gas atmosphere in the range of from 350 to 600° C., preferably in the range of from 400 to 550° C. Preferably, the gas atmosphere comprises oxygen. More preferably, the gas atmosphere comprises air, lean air, or nitrogen such as technical nitrogen, more preferably air. More preferably, the gas atmosphere is air.

Generally, it may be conceivable that the zeolitic material is provided in its ammonium form, in its hydrogen form (H form), or in any other suitable cation form such as in its sodium form. Preferably, the zeolitic material provided in (i) is in its hydrogen (H) form.

According to the present invention, it can be advantageous to employ a naturally occurring zeolitic material having framework type CHA. Generally, a naturally occurring zeolitic material having framework type CHA may have, among others, a chemical composition as shown in FIG. 11 herein wherein, in the context of the present invention, such naturally occurring zeolitic material having framework type CHA are employed having a silica:alumina ratio of at most 20:1, preferably in the range of from 3:1 to 20:1, more preferably in the range of from 4:1 to 15:1, more preferably in the range of from 5:1 to 10:1.

In the context of step (ii) of the inventive process, the synthesis mixture prepared in (ii) which is subjected to (iii) preferably does not comprise a zeolitic material having framework type AEI. More preferably, the synthesis mixture prepared in (ii) which is subjected to (iii) does not contain a zeolitic seed material having framework type AEI.

Generally, according to (ii), any suitable source of the tetravalent element Y can be used. In particular if Y is Si, the source of Y comprises, more preferably is, one or more of a wet-process silica, a dry-process silica, and a colloidal silica. Colloidal silica, preferably as an alkaline and/or ammoniacal solution, more preferably as an ammoniacal solution, is commercially available, inter alia, for example as Ludox®, Syton®, Nalco® or Snowtex®. "Wet process" silica is commercially available, inter alia, for example as Hi-Sil®, Ultrasil®, Vulcasil®, Santocel®, Valron-Estersil®, Tokusil® or Nipsil®. "Dry process" silica is commercially available, inter alia, for example as Aerosil®, Reolosil®, Cab-O-Sil®, Fransil® or ArcSilica®. Inter alia, an ammoniacal solution of colloidal silica can be used according to the present invention. More preferably, if Y is Si, the source of the tetravalent element Y according to (ii) comprises, preferably is, a colloidal silica.

According to (ii), the AEI framework structure directing agent can be any agent which results in the preparation of a zeolitic material having framework type AEI according to (iii). Preferably, the AEI framework structure directing agent comprises one or more quaternary phosphonium cation containing compounds and/or one or more quaternary ammonium cation containing compounds.

Preferably, the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, more preferably $(C_1-C_5)$ alkyl, more preferably $(C_1-C_4)$alkyl, more preferably $(C_2-C_3)$alkyl, and preferably for optionally substituted methyl or ethyl, more preferably $R^1$, $R^2$, $R^3$, and $R^4$ stand for optionally substituted ethyl, preferably unsubstituted ethyl;

Preferably, the one or more quaternary ammonium cation containing compounds comprise one or more N,N-dialkyl-dialkylpiperidinium cation containing compounds, more preferably one or more N,N—$(C_1-C_3)$dialkyl-$(C_1-C_3)$dialkylpiperidinium cation containing compounds, more preferably one or more N,N—$(C_1-C_2)$dialkyl-$(C_1-C_2)$dialkylpiperidinium cation containing compounds, wherein more preferably, the one or more quaternary ammonium cation containing compounds are selected from the group consisting of N,N—$(C_1-C_2)$dialkyl-2,6-$(C_1-C_2)$dialkylpiperidinium cation and N,N—$(C_1-C_2)$dialkyl-3,5-$(C_1-C_2)$dialkylpiperidinium cation containing compounds, more preferably from the group consisting of N,N-dimethyl-2,6-$(C_1-C_2)$dialkylpiperidinium cation and N,N-dimethyl-3,5-$(C_1-C_2)$dialkylpiperidinium cation containing compounds, more preferably from the group consisting of N,N-dimethyl-2,6-dimethylpiperidinium cation and N,N-dimethyl-3,5-dimethylpiperidinium cation containing compounds.

Preferably, the one or more quaternary phosphonium cation containing compounds and/or the one or more quaternary ammonium cation containing compounds are salts, preferably selected from the group consisting of halides, more preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, and more preferably hydroxides.

More preferably the AEI framework structure directing agent comprises, preferably is N,N-dimethyl-3,5-dimethylpiperidinium hydroxide.

Preferably, in the synthesis mixture prepared in (ii) which is subjected to (iii), the weight ratio of the zeolitic material relative to the source of the tetravalent element Y, calculated as $YO_2$, is in the range of from 1.0:1 to 3.0:1, more preferably in the range of from 1.5:1 to 2.5, more preferably in the range of from 2.0:1 to 2.2:1. According to a conceivable embodiment of the present invention, the weight ratio of the zeolitic material relative to the source of the tetravalent element Y may be infinity, which means that in addition to the zeolitic material which comprises Y, no further source of the tetravalent element is comprised in the synthesis mixture in (ii).

Preferably, in the synthesis mixture prepared in (ii) which is subjected to (iii), the weight ratio of the zeolitic material relative to the water is in the range of from 0.005:1 to 0.030:1, more preferably in the range of from 0.010:1 to 0.025:1, more preferably in the range of from 0.015:1 to 0.020:1.

Preferably, in the synthesis mixture prepared in (ii) which is subjected to (iii), the weight ratio of the zeolitic material relative to the AEI framework structure directing agent is in the range of from 0.1:1 to 0.9:1, preferably in the range of from 0.3:1 to 0.7:1, more preferably in the range of from 0.4:1 to 0.5:1.

The pH of the synthesis mixture prepared in (ii) is not restricted to any particular value. Preferably, the synthesis mixture prepared in (ii) which is subjected to (iii) additionally comprises a source of a base, more preferably a source of hydroxide.

Preferably, the synthesis mixture prepared in (ii) which is subjected to (iii) additionally comprises a source of one or more of an alkali metal such as sodium, lithium, potassium, and an alkaline earth metal such as magnesium, calcium, strontium, barium, more preferably an alkali metal, more preferably sodium.

More preferably, the source of a base is the source of one or more of an alkali metal and an alkaline earth metal, preferably an alkali metal base, more preferably an alkali metal hydroxide, more preferably sodium hydroxide.

The synthesis mixture prepared in (ii) which is subjected to (iii) is not restricted to any particular weight ratio of the components comprised in the mixture. Preferably, in the synthesis mixture prepared in (ii) which is subjected to (iii), the weight ratio of the zeolitic material relative to the source of a base is in the range of from 0.1:1 to 1.0:1, preferably in the range of from 0.2:1 to 0.8:1, more preferably in the range of from 0.3:1 to 0.6:1.

Preferably, the synthesis mixture prepared in (ii) which is subjected to (iii) does not comprise a source of Cu, preferably does not comprise a a source of one or more of Cu and Fe, more preferably does not comprise a source of one or more of Fe, Co, Ni, Cu, and Zn, more preferably does not comprise a source of a metal M other than Y and X if Y or X is a metal.

Preferably, the synthesis mixture prepared in (ii) which is subjected to (iii) does not comprise a source of fluoride, preferably does not comprise a source of halide. Preferably, the synthesis mixture prepared in (ii) which is subjected to (iii) does not comprise a source of Al, other than the zeolitic material provided in (i), preferably does not comprise a source of X, more preferably does not comprise a source of Al, B, Ga, In or a combination thereof, other than the zeolitic material provided in (i).

Preferably at least 95 weight-%, more preferably at least 98 weight-%, more preferably at least 99 weight-% of the synthesis mixture prepared in (ii) which is subjected to (iii) consist of the zeolitic material provided in (i), the water, the source of the tetravalent element Y, the AEI framework structure directing agent, and preferably the source of a base and the source of one or more of an alkali metal and an alkaline earth metal.

Step (iii) of the inventive process comprises subjecting the synthesis mixture prepared in (ii) to hydrothermal synthesis conditions.

Preferably, the hydrothermal synthesis is carried out under autogenous pressure, preferably in an autoclave. Preferably, the synthesis mixture prepared in (ii) is heated in the autoclave to the hydrothermal synthesis temperature at a heating rate in the range of from 0.5 to 4 K/min, more preferably in the range of from 1 to 3 K/min. Preferably, the hydrothermal synthesis temperature to which the mixture is heated is in the range of from 110 to 175° C., preferably in the range of from 120 to 150° C. Preferably, the hydrothermal synthesis conditions further comprise stirring the synthesis mixture during at least a part of the synthesis time. Preferably, the hydrothermal synthesis conditions further comprise a hydrothermal synthesis time in the range of from 2 to 120 h, more preferably in the range of from 20 to 100 h, more preferably in the range of from 40 to 80 h. Therefore, it is preferred that according to (iii), the mixture provided in (ii) is heated to a temperature in the range of from 110 to 175° C., preferably in the range of from 120 to 150° C., and kept at this temperature for a period of time in the range of from 2 to 120 h. Therefore, it is further preferred that according to (iii), the mixture provided in (ii) is heated to a temperature in the range of from 110 to 175° C., preferably in the range of from 120 to 150° C., and kept at this temperature for a period of time in the range of from 20 to 120 h. Therefore, it is further preferred that according to (iii), the mixture provided in (ii) is heated to a temperature in the range of from 110 to 175° C., preferably in the range of from 120 to 150° C., and kept at this temperature for a period of time in the range of from 40 to 80 h.

From the hydrothermal synthesis according to (iii), a mixture is obtained which comprises the zeolitic material having framework type AEI suspended in its mother liquor, at the hydrothermal synthesis temperature. Since the hydrothermal synthesis is carried out under autogenous pressure, it is preferred (iii) further comprises depressurize the mixture. Either before, during, or after depressurizing, the inventive process preferably further comprises:

(iv) cooling the mixture obtained from (iii).

While there are no specific restrictions, it is preferred to cool the mixture to a temperature in the range of from 10 to 50° C., more preferably in the range of from 20 to 35° C.

Since, as mentioned above, a mixture is obtained from (iii) which comprises the zeolitic material having framework type AEI suspended in its mother liquor, it is further preferred that the inventive process further comprises:

(v) separating the zeolitic material from the mixture obtained from (iii) or (iv), preferably from the mixture obtained from (iv).

There are no specific restrictions on how the zeolitic material is separated. Preferably, said separation step (v) comprises (v.1) subjecting the mixture obtained from (iii) or (iv) to a solid-liquid separation method, preferably comprising a filtration method or a spraying method;
(v.2) preferably washing the zeolitic material obtained from (v.1);
(v.3) drying the zeolitic material obtained from (v.1) or (v.2), preferably (v.2).

As to (v.1), a spraying method may comprise spray-drying or spray-granulation. If (v.2) is carried out, it is preferred that the zeolitic material is washed with water as washing agent, preferably until the washing water has a conductivity of at most 500 microSiemens, preferably at most 200 microSiemens. As to (v.3), is is preferred that the zeolitic material is dried in a gas atmosphere having a temperature in the range of from 80 to 175° C., more preferably in the range of from 100 to 150° C. Preferably, the gas atmosphere comprises oxygen, more preferably comprises, more preferably is air, lean air, or synthetic air.

Preferably, the inventive process further comprises
(vi) calcining the zeolitic material obtained from (v).

If step (vi) is carried out, the zeolitic material is preferably calcined in a gas atmosphere having a temperature in the range of from 400 to 600° C., more preferably in the range of from 450 to 550° C. Preferably, the gas atmosphere comprises oxygen, more preferably comprises, more preferably is air, lean air, or synthetic air.

Preferably, in the framework structure of the zeolitic material obtained in (iii), the molar ratio X:Y, calculated as $X_2O_3:YO_2$ is at least 0.01:1, more preferably at least 0.02:1, more preferably at least 0.04:1, more preferably at least 0.05:1. Preferably, in the framework structure of the zeolitic material obtained in (iii), the molar ratio X:Y, calculated as $X_2O_3:YO_2$, is in the range of from 0.01:1 to 0.23:1, more preferably in the range of from 0.02:1 to 0.21:1, more preferably in the range of from 0.03:1 to 0.19:1, more preferably in the range of from 0.04:1 to 0.17:1, more preferably in the range of from 0.05:1 to 0.15:1, more preferably in the range of from 0.06:1 to 0.13:1, more preferably in the range of from 0.07:1 to 0.11:1. It is alternatively preferred that in the framework structure of the zeolitic material obtained in (iii), the molar ratio X:Y, calculated as $X_2O_3:YO_2$, is in the range of from 0.01:1 to 0.17:1, more preferably in the range of from 0.02:1 to 0.15:1, more preferably in the range of from 0.03:1 to 0.13:1, more preferably in the range of from 0.04:1 to 0.11:1, more preferably in the range of from 0.05:1 to 0.09:1.

Therefore, the present invention further preferably relates to a process for preparing a zeolitic material having framework type AEI and having a framework structure which comprises a tetravalent element Y, a trivalent element X, and oxygen, preferably the process as described herein above, wherein the zeolitic material provided in (i) is a calcined zeolitic material, said process comprising (i) providing a zeolitic material having framework type CHA and having a framework structure comprising the tetravalent element Y, the trivalent element X, and oxygen;

(ii) preparing a synthesis mixture comprising the zeolitic material provided in (i), water, a source of the tetravalent element Y other than the zeolitic material provided in (i), and an AEI framework structure directing agent;

(iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;

(iv) cooling the mixture obtained from (iii), preferably to a temperature in the range of from 10 to 50° C., more preferably in the range of from 20 to 35° C.;

(v) separating the zeolitic material from the mixture obtained from (iv), comprising
 (v.1) subjecting the mixture obtained from (iv) to a solid-liquid separation method, preferably comprising a filtration method or a spraying method;
 (v.2) washing the zeolitic material obtained from (v.1);
 (v.3) drying the zeolitic material obtained from (v.2) in a gas atmosphere having a temperature in the range of from 80 to 175° C.;

(vi) calcining the zeolitic material obtained from (v) in a gas atmosphere having a temperature in the range of from 400 to 600° C.;

wherein Y is Si and X is Al and wherein the molar ratio Y:X, calculated as $YO_2:X_2O_3$, is at most 20:1

Generally, it is possible that according to the process of the present invention, the conversion process described above resulting in the zeolitic material having framework type AEI is an essentially complete conversion, and the material obtained essentially consists of the zeolitic material having framework type AEI. However, it is also possible that the conversion is partially incomplete, and in the material obtained, not only the zeolitic material having framework type AEI is comprised, but also one or more other materials, preferably one or more zeolitic materials having a framework type other then AEI, preferably a zeolitic material having a framework type CHA. Preferably, regarding such a respectively obtained composition, more than 50 weight-%, more preferably at least 60 weight-%, more preferably at least 70 weight-% of said composition comprising a zeolitic material having framework type AEI and having a framework structure which comprises a tetravalent element Y, a trivalent element X, and oxygen, consist of the zeolitic material having framework type AEI and having a framework structure which comprises a tetravalent element Y, a trivalent element X, and oxygen. More preferably at least 75 weight-%, more preferably at least 85 weight-%, more preferably at least 90 weight-% of the composition comprising a zeolitic material having framework type AEI and having a framework structure which comprises a tetravalent element Y, a trivalent element X, and oxygen, consist of the zeolitic material having framework type AEI and having a framework structure which comprises a tetravalent element Y, a trivalent element X, and oxygen. More preferably, at least 90 weight-%, more preferably at least 95 weight-%, more preferably at least 99 weight-% of the composition consist of the zeolitic material having framework type AEI and having a framework structure which comprises a tetravalent element Y, a trivalent element X, and oxygen, and a zeolitic material having framework type CHA and having a framework structure which comprises a tetravalent element Y, a trivalent element X, and oxygen. Such a partially incomplete conversion leading to said composition comprising the zeolitic material having framework type AEI is taken into account in the second set of preferred embodiments of the present invention which is directed, e.g., to a process for preparing a composition. For the sake of completeness, it is mentioned that also for these embodiments, in case the conversion is complete, the composition is to be understood as consisting of the zeolitic material having framework type AEI. In any case, even if the conversion is partially incomplete, the invention nevertheless is directed, e.g., to a process for preparing a zeolitic material having framework type AEI since this zeolitic material is mandatorily comprised in said composition.

Depending on the intended use of the zeolitic material, the material, preferably obtained from (vi) can be employed as such. Further, it is conceivable that this zeolitic material is subjected to one or more further post-treatment steps. For example, the zeolitic material which is most preferably obtained as a powder can be suitably processed to a molding or a shaped body by any suitably method, including, but no restricted to, extruding, tabletting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titania, zirconia, alumina, and a mixed oxide of two or more of silicon, titanium and zirconium. The weight ratio of the zeolitic material relative to the binder is generally not subject to any specific restrictions and may be, for example, in the range of from 10:1 to 1:10. According to a further example according to which the zeolitic material is used, for example, as a catalyst or as a catalyst component for treating an exhaust gas stream, for example an exhaust gas stream of an engine, it is possible that the zeolitic material is used as a component of a washcoat to be applied onto a suitable substrate, such as a wall-flow filter or the like.

Preferably, the synthesis mixture prepared in (ii) which is subjected to (iii) does not comprise a source of fluoride, preferably does not comprise a source of halide. Preferably, the synthesis mixture prepared in (ii) which is subjected to (iii) does not comprise a source of Al, other than the zeolitic material provided in (i), preferably does not comprise a source of X, more preferably does not comprise a source of Al, B, Ga, In or a combination thereof, other than the zeolitic material provided in (i).

Preferably, in the framework structure of the zeolitic material obtained in (iii), the molar ratio X:Y, calculated as $X_2O_3:YO_2$ is at least 0.01:1, more preferably at least 0.02:1, more preferably at least 0.04:1, more preferably at least 0.05:1. Preferably, in the framework structure of the zeolitic material obtained in (iii), the molar ratio X:Y, calculated as $X_2O_3$:$YO_2$, is in the range of from 0.01:1 to 0.23:1, more preferably in the range of from 0.02:1 to 0.21:1, more preferably in the range of from 0.03:1 to 0.19:1, more preferably in the range of from 0.04:1 to 0.17:1, more preferably in the range of from 0.05:1 to 0.15:1, more preferably in the range of from 0.06:1 to 0.13:1, more preferably in the range of from 0.07:1 to 0.11:1. It is alternatively preferred that in the framework structure of the zeolitic material obtained in (iii), the molar ratio X:Y, calculated as $X_2O_3$:$YO_2$, is in the range of from 0.01:1 to 0.17:1, more preferably in the range of from 0.02:1 to 0.15:1, more preferably in the range of from 0.03:1 to 0.13:1, more preferably in the range of from 0.04:1 to 0.11:1, more preferably in the range of from 0.05:1 to 0.09:1.

According to a preferred embodiment of the present invention, the zeolitic material is subjected to a post-treatment which comprises supporting a metal M on the zeolitic material. Therefore, the present invention further preferably relates to the process as described above, further comprising
(vii) supporting a metal M on the zeolitic material, preferably on the zeolitic material obtained from (vi).

Preferably, (vii) comprises:
(vii.1) preparing a mixture comprising the zeolitic material, preferably the zeolitic material obtained from (vi), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;
(vii.2) heating the mixture prepared in (vii.1) to a temperature in the range of from 30 to 90° C., preferably in the range of from 40 to 80° C.;
(vii.3) preferably cooling, more preferably rapid-cooling the mixture obtained from (vii.2);
(vii.4) separating the zeolitic material comprising the metal M from the mixture obtained from (vii.2) or (vii.3), preferably from (vii.3), the separating preferably comprising washing the zeolitic material comprising the metal M;
(vii.5) preferably drying the zeolitic material comprising the metal M obtained from (vii.4) in a gas atmosphere, preferably at a temperature of the gas atmosphere in the range of from 90 to 200° C., more preferably in the range of from 100 to 150° C., wherein the gas atmosphere preferably comprises oxygen;
(vii.6) preferably calcining the zeolitic material comprising the metal M obtained from (vii.4) or (vii.5), preferably (vii.5), in a gas atmosphere, preferably at a temperature of the gas atmosphere in the range of from 350 to 600° C., more preferably in the range of from 400 to 550° C., wherein the gas atmosphere preferably comprises oxygen.

Preferably, the metal M is a transition metal of groups 8 to 12 of the periodic system of elements. More preferably, the metal M is one or more of Fe, Co, Ni, Cu, and Zn, more preferably one or more of Fe and Cu. More preferably, the metal M comprises, preferably is Cu. Preferably, according to (vii), the metal M is supported on the zeolitic material in an amount in the range of from 0.1 to 5 weight-%, more preferably in the range of from 0.2 to 4 weight-%, more preferably in the range of from 0.5 to 3 weight-%, calculated as elemental M and based on the total weight of the zeolitic material.

Depending on the intended use of the zeolitic material, the material, preferably obtained from (vii) can be employed as such. Further, it is conceivable that this zeolitic material is subjected to one or more further post-treatment steps. For example, the zeolitic material which is most preferably obtained as a powder can be suitably processed to a molding or a shaped body by any suitably method, including, but no restricted to, extruding, tabletting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titania, zirconia, alumina, and a mixed oxide of two or more of silicon, titanium and zirconium. The weight ratio of the zeolitic material relative to the binder is generally not subject to any specific restrictions and may be, for example, in the range of from 10:1 to 1:10. According to a further example according to which the zeolitic material is used, for example, as a catalyst or as a catalyst component for treating an exhaust gas stream, for example an exhaust gas stream of an engine, it is possible that the zeolitic material is used as a component of a washcoat to be applied onto a suitable substrate, such as a wall-flow filter or the like.

The present invention further relates to a zeolitic material having framework type AEI and having a framework structure which comprises a tetravalent element Y, a trivalent element X, and oxygen, obtainable or obtained or preparable or prepared by a process according to a process described herein above.

The present invention yet further relates to a zeolitic material comprising a metal M, having framework type AEI and having a framework structure which comprises a tetravalent element Y, a trivalent element X, and oxygen, obtainable or obtained or preparable or prepared by a process as described herein above comprising supporting a metal M on the zeolitic material according to (vii).

Preferably, said zeolitic material has a total amount of acid sites in the range of from 1.0 to 2.0 mmol/g, wherein the total amount of acid sites is defined as the total molar amount of desorbed ammonia per mass of the zeolitic material determined according to the temperature programmed desorption of ammonia (NH3-TPD) as described in Reference Example 1.6 herein; wherein the zeolitic material has an amount of medium acid sites in the range of from 0.1 to 0.8 mmol/g, wherein the amount of medium acid sites is defined as the amount of desorbed ammonia per mass of the zeolitic material determined according to the temperature programmed desorption of ammonia (NH3-TPD) as described in Reference Example 1.6 herein in the temperature range of from 250 to 500° C.

The zeolitic material of the present invention having framework type AEI and having a framework structure which comprises a tetravalent element Y, a trivalent element X, and oxygen can be used for any conceivable purpose, including, but not limited to, an absorbent, an adsorbent, a molecular sieve, a catalyst, a catalyst carrier or an intermediate for preparing one or more thereof. Preferably, the zeolitic material of the present invention is used as a catalytically active material, as a catalyst, or as a catalyst component, more preferably for the selective catalytic reduction of nitrogen oxides in an exhaust gas stream, preferably an exhaust gas stream from a diesel engine. More preferably, for the conversion of a C1 compound to one or more olefins, preferably for the conversion of methanol to one or more olefins or the conversion of a synthetic gas comprising carbon monoxide and hydrogen to one or more olefins.

Further, the present invention relates to a method for selectively catalytically reducing nitrogen oxides in an exhaust gas stream, preferably an exhaust gas stream from a diesel engine, said method comprising bringing said exhaust gas stream in contact with a catalyst comprising the zeolitic material according to the present invention.

Yet further, the present invention relates to a method for selectively catalytically reducing nitrogen oxides in an exhaust gas stream, preferably an exhaust gas stream from a diesel engine, said method comprising preparing a zeolitic material having framework type AEI and having a framework structure which comprises a tetravalent element Y, a trivalent element X, and oxygen by a process according to the present invention, preferably a process according to the present invention which comprises supporting a metal M on the zeolitic material according to (vii), and bringing said exhaust gas stream in contact with a catalyst comprising said zeolitic material.

The present invention also relates to a method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the zeolitic material according to the present invention.

The present invention further relates to a method for catalytically converting a C1 compound to one or more olefins, preferably converting methanol to one or more olefins or converting a synthetic gas comprising carbon monoxide and hydrogen to one or more olefins, said method comprising preparing a zeolitic material having framework type AEI and having a framework structure which comprises a tetravalent element Y, a trivalent element X, and oxygen by a process according to the present invention, preferably a process according to the present invention which comprises supporting a metal M on the zeolitic material according to (vii), and bringing said C1 compound in contact with a catalyst comprising said zeolitic material.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a zeolitic material having framework type AEI and having a framework structure which comprises a tetravalent element Y, a trivalent element X, and oxygen, said process comprising
    (i) providing a zeolitic material having framework type CHA and having a framework structure comprising the tetravalent element Y, the trivalent element X, and oxygen;
    (ii) preparing a synthesis mixture comprising the zeolitic material provided in (i), water, a source of the tetravalent element Y other than the zeolitic material provided in (i), and an AEI framework structure directing agent;
    (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
    wherein Y is one or more of Si, Ge, Sn, Ti, Zr;
    wherein X is one or more of Al, B, Ga, In;
    wherein in the framework structure of the zeolitic material provided in (i), the molar ratio Y:X, calculated as $YO_2:X_2O_3$, is at most 20:1.
2. The process of embodiment 1, wherein Y is Si.
3. The process of embodiment 1 or 2, wherein X is Al.
4. The process of any one of embodiments 1 to 3, wherein Y is Si and X is Al.
5. The process of any one of embodiments 1 to 4, wherein at least 95 weight-%, preferably at least 98 weight-%, more preferably at least 99 weight-%, more preferably at least 99.5 weight-% of the framework of the zeolitic material provided in (i) consist of Y, X, O, and H.
6. The process of any one of embodiments 1 to 5, wherein the zeolitic material provided in (i) does not comprise Cu, preferably does not comprise one or more of Cu and Fe, more preferably does not comprise one or more of Fe, Co, Ni, Cu, and Zn, more preferably does not comprise a metal M other than Y and X if Y or X is a metal.
7. The process of any one of embodiments 1 to 6, wherein the content of the zeolitic material provided in (i) with regard to Cu, calculated as element, preferably with regard to one or more of Cu and Fe, each calculated as element, more preferably with regard to one or more of Fe, Co, Ni, Cu, and Zn, each calculated as element, more preferably with regard to a metal M, calculated as element, other than Y and X if Y or X is a metal, is at most 500 weight-ppm, preferably at most 100 weight-ppm, based on the total weight of the zeolitic material.
8. The process of any of embodiments 1 to 7, wherein in the framework structure of the zeolitic material provided in (i), the molar ratio Y:X, calculated as $YO_2:X_2O_3$, is in the range of from 3:1 to 20:1, preferably in the range of from 4:1 to 15:1, more preferably in the range of from 5:1 to 10:1.
9. A process for preparing a zeolitic material having framework type AEI and having a framework structure which comprises a tetravalent element Y, a trivalent element X, and oxygen, preferably the process of any one of embodiments 1 to 8, said process comprising
    (i) providing a zeolitic material having framework type CHA and having a framework structure comprising the tetravalent element Y, the trivalent element X, and oxygen;
    (ii) preparing a synthesis mixture comprising the zeolitic material provided in (i), water, a source of the tetravalent element Y other than the zeolitic material provided in (i), and an AEI framework structure directing agent;
    (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
    wherein Y is Si;
    wherein X is Al;
    wherein in the framework structure of the zeolitic material provided in (i), the molar ratio Y:X, calculated as $YO_2:X_2O_3$, is in the range of from 5:1 to 10:1.
10. The process of any one of embodiments 1 to 9, wherein the zeolitic material provided in (i) is a calcined zeolitic material, preferably a zeolitic material calcined in a gas atmosphere at a temperature of the gas atmosphere in the range of from 350 to 600° C., preferably in the range of from 400 to 550° C., wherein the gas atmosphere preferably comprises oxygen.

11. The process of any one of embodiments 1 to 10, wherein the zeolitic material provided in (i) is in its H form.

12. The process of any one of embodiments 1 to 11, wherein the synthesis mixture prepared in (ii) which is subjected to (iii) does not comprise a zeolitic material having framework type AEI.

13. The process of any one of embodiments 1 to 12, wherein the synthesis mixture prepared in (ii) which is subjected to (iii) does not contain a zeolitic seed material having framework type AEI.

14. The process of any one of embodiments 1 to 13, wherein Y is Si and the source of the tetravalent element Y according to (ii) comprises one or more of a wet-process silica, a dry-process silica, and a colloidal silica.

15. The process of any one of embodiments 1 to 14, wherein Y is Si and the source of the tetravalent element Y according to (ii) comprises, preferably is a colloidal silica.

16. The process of any one of embodiments 1 to 15, wherein the AEI framework structure directing agent comprises one or more quaternary phosphonium cation containing compounds and/or one or more quaternary ammonium cation containing compounds;
wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, preferably $(C_1-C_5)$alkyl, more preferably $(C_1-C_4)$alkyl, more preferably $(C_2-C_3)$alkyl, and even more preferably for optionally substituted methyl or ethyl, wherein even more preferably $R^1$, $R^2$, $R^3$, and $R^4$ stand for optionally substituted ethyl, preferably unsubstituted ethyl;
wherein the one or more quaternary ammonium cation containing compounds comprise one or more N,N-dialkyl-dialkylpiperidinium cation containing compounds, preferably one or more N,N—$(C_1-C_3)$dialkyl-$(C_1-C_3)$dialkylpiperidinium cation containing compounds, more preferably one or more N,N—$(C_1-C_2)$dialkyl-$(C_1-C_2)$dialkylpiperidinium cation containing compounds, wherein more preferably, the one or more quaternary ammonium cation containing compounds are selected from the group consisting of N,N—$(C_1-C_2)$dialkyl-2,6-$(C_1-C_2)$dialkylpiperidinium cation and N,N—$(C_1-C_2)$dialkyl-3,5-$(C_1-C_2)$dialkylpiperidinium cation containing compounds, more preferably from the group consisting of N,N-dimethyl-2,6-$(C_1-C_2)$dialkylpiperidinium cation and N,N-dimethyl-3,5-$(C_1-C_2)$dialkylpiperidinium cation containing compounds, more preferably from the group consisting of N,N-dimethyl-2,6-dimethylpiperidinium cation and N,N-dimethyl-3,5-dimethylpiperidinium cation containing compounds;
wherein the one or more quaternary phosphonium cation containing compounds and/or the one or more quaternary ammonium cation containing compounds are salts, preferably selected from the group consisting of halides, preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, and even more preferably hydroxides.

17. The process of any one of embodiments 1 to 16, wherein the AEI framework structure directing agent comprises, preferably is N,N-dimethyl-3,5-dimethylpiperidinium hydroxide.

18. The process of any one of embodiments 1 to 17, wherein in the synthesis mixture prepared in (ii) which is subjected to (iii), the weight ratio of the zeolitic material relative to the source of the tetravalent element Y, calculated as $YO_2$, is in the range of from 1.0:1 to 3.0:1, preferably in the range of from 1.5:1 to 2.5, more preferably in the range of from 2.0:1 to 2.2:1.

19. The process of any one of embodiments 1 to 18, wherein in the synthesis mixture prepared in (ii) which is subjected to (iii), the weight ratio of the zeolitic material relative to the water is in the range of from 0.005:1 to 0.030:1, preferably in the range of from 0.010:1 to 0.025:1, more preferably in the range of from 0.015:1 to 0.020:1.

20. The process of any one of embodiments 1 to 19, wherein in the synthesis mixture prepared in (ii) which is subjected to (iii), the weight ratio of the zeolitic material relative to the AEI framework structure directing agent is in the range of from 0.1:1 to 0.9:1, preferably in the range of from 0.3:1 to 0.7:1, more preferably in the range of from 0.4:1 to 0.5:1.

21. The process of any one of embodiments 1 to 20, wherein the synthesis mixture prepared in (ii) which is subjected to (iii) additionally comprises a source of a base, preferably a source of hydroxide.

22. The process of any one of embodiments 1 to 21, wherein the synthesis mixture prepared in (ii) which is subjected to (iii) additionally comprises a source of one or more of an alkali metal and an alkaline earth metal, preferably an alkali metal, more preferably sodium.

23. The process of embodiment 21 or 22, wherein the source of a base is the source of one or more of an alkali metal and an alkaline earth metal, preferably an alkali metal base, more preferably an alkali metal hydroxide, more preferably sodium hydroxide.

24. The process of any one of embodiments 21 to 23, wherein in the synthesis mixture prepared in (ii) which is subjected to (iii), the weight ratio of the zeolitic material relative to the source of a base is in the range of from 0.1:1 to 1.0:1, preferably in the range of from 0.2:1 to 0.8:1, more preferably in the range of from 0.3:1 to 0.6:1.

25. The process of any one of embodiments 1 to 24, wherein the synthesis mixture prepared in (ii) which is subjected to (iii) does not comprise a source of Cu, preferably a source of one or more of Cu and Fe, more preferably a source of one or more of Fe, Co, Ni, Cu, and Zn, more preferably a source of a metal M other than Y and X if Y or X is a metal.

26. The process of any one of embodiments 1 to 25, wherein the synthesis mixture prepared in (ii) which is subjected to (iii) does not comprise a source of fluoride, preferably does not comprise a source of halide.

27. The process of any one of embodiments 1 to 26, wherein the synthesis mixture prepared in (ii) which is subjected to (iii) does not comprise a source of Al other than the zeolitic material provided in (i), preferably does not comprise a source of X, more preferably does not comprise a source of Al, B, Ga, In or a combination thereof, other than the zeolitic material provided in (i).

28. The process of any one of embodiments 1 to 27, wherein at least 95 weight-%, preferably at least 98 weight-%, more preferably at least 99 weight-% of the synthesis mixture prepared in (ii) which is subjected to (iii) consist of the zeolitic material provided in (i), the water, the source of the tetravalent element Y, the AEI framework structure directing agent, and preferably the source of a base and the source of one or more of an alkali metal and an alkaline earth metal.

29. The process of any one of embodiments 1 to 28, wherein the hydrothermal synthesis is carried out under autogenous pressure, preferably in an autoclave.

30. The process of any one of embodiments 1 to 29, wherein the synthesis mixture prepared in (ii) is heated in the autoclave to the hydrothermal synthesis temperature at a heating rate in the range of from 0.5 to 4 K/min, preferably in the range of from 1 to 3 K/min.

31. The process of any one of embodiments 1 to 30, wherein the hydrothermal synthesis temperature is in the range of from 110 to 175° C., preferably in the range of from 120 to 150° C.

32. The process of any one of embodiments 1 to 31, wherein the hydrothermal synthesis conditions comprise stirring the synthesis mixture.

33. The process of any one of embodiments 1 to 32, wherein the hydrothermal synthesis conditions comprise a hydrothermal synthesis time in the range of from 2 to 120 h, preferably in the range of from 20 to 100 h, more preferably in the range of from 40 to 80 h.

34. The process of any one of embodiments 1 to 33, further comprising
    (iv) cooling the mixture obtained from (iii), preferably to a temperature in the range of from 10 to 50° C., more preferably in the range of from 20 to 35° C.

35. The process of any one of embodiments 1 to 34, further comprising
    (v) separating the zeolitic material from the mixture obtained from (iii) or (iv).

36. The process of embodiment 35, wherein (v) comprises
    (v.1) subjecting the mixture obtained from (iii) or (iv) to a solid-liquid separation method, preferably comprising a filtration method or a spraying method;
    (v.2) preferably washing the zeolitic material obtained from (v.1);
    (v.3) drying the zeolitic material obtained from (v.1) or (v.2), preferably (v.2).

37. The process of embodiment 36, wherein according to (v.2), the zeolitic material is washed with water, preferably until the washing water has a conductivity of at most 500 microSiemens, preferably at most 200 microSiemens.

38. The process of embodiment 36 or 37, wherein according to (v.3), the zeolitic material is dried in a gas atmosphere having a temperature in the range of from 80 to 175° C., preferably in the range of from 100 to 150° C.

39. The process of embodiment 38, wherein the gas atmosphere comprises oxygen, preferably is air, lean air, or synthetic air.

40. The process of any one of embodiments 35 to 39, further comprising
    (vi) calcining the zeolitic material obtained from (v).

41. The process of embodiment 40, wherein according to (vi), the zeolitic material is calcined in a gas atmosphere having a temperature in the range of from 400 to 600° C., preferably in the range of from 450 to 550° C.

42. The process of embodiment 41, wherein the gas atmosphere comprises oxygen, preferably is air, lean air, or synthetic air.

43. The process of any one of embodiments 1 to 42, wherein in the framework structure of the zeolitic material obtained in (iii), the molar ratio X:Y, calculated as $X_2O_3$:$YO_2$, is at least 0.01:1, preferably at least 0.02:1, more preferably at least 0.03:1, more preferably at least 0.04:1, more preferably at least 0.05:1.

44. The process of embodiment 43, wherein in the framework structure of the zeolitic material obtained in (iii), the molar ratio X:Y, calculated as $X_2O_3$:$YO_2$, is in the range of from 0.01:1 to 0.23:1, preferably in the range of from 0.02:1 to 0.21:1, more preferably in the range of from 0.03:1 to 0.19:1, more preferably in the range of from 0.04:1 to 0.17:1, more preferably in the range of from 0.05:1 to 0.15:1, more preferably in the range of from 0.06:1 to 0.13:1, more preferably in the range of from 0.07:1 to 0.11:1.

45. The process of embodiment 43, wherein in the framework structure of the zeolitic material obtained in (iii), the molar ratio X:Y, calculated as $X_2O_3$:$YO_2$, is in the range of from 0.01:1 to 0.17:1, preferably in the range of from 0.02:1 to 0.15:1, more preferably in the range of from 0.03:1 to 0.13:1, more preferably in the range of from 0.04:1 to 0.11:1, more preferably in the range of from 0.05:1 to 0.09:1.

46. A process for preparing a zeolitic material having framework type AEI and having a framework structure which comprises a tetravalent element Y, a trivalent element X, and oxygen, preferably the process of any one of embodiments 1 to 10, said process comprising
    (i) providing a zeolitic material having framework type CHA and having a framework structure comprising the tetravalent element Y, the trivalent element X, and oxygen;
    (ii) preparing a synthesis mixture comprising the zeolitic material provided in (i), water, a source of the tetravalent element Y other than the zeolitic material provided in (i), and an AEI framework structure directing agent;
    (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
    (iv) cooling the mixture obtained from (iii), preferably to a temperature in the range of from 10 to 50° C., more preferably in the range of from 20 to 35° C.;
    (v) separating the zeolitic material from the mixture obtained from (iv), comprising
        (v.1) subjecting the mixture obtained from (iv) to a solid-liquid separation method, preferably comprising a filtration method or a spraying method;
        (v.2) washing the zeolitic material obtained from (v.1);
        (v.3) drying the zeolitic material obtained from (v.2) in a gas atmosphere having a temperature in the range of from 80 to 175° C.;
    (vi) calcining the zeolitic material obtained from (v) in a gas atmosphere having a temperature in the range of from 400 to 600° C.;
    wherein Y is Si and X is Al and wherein the molar ratio Y:X, calculated as $YO_2$:$X_2O_3$, is at most 20:1.

47. The process of embodiment 46, wherein the synthesis mixture prepared in (ii) which is subjected to (iii) does not comprise a source of fluoride, preferably does not comprise a source of halide.

48. The process of embodiment 46 or 47, wherein the synthesis mixture prepared in (ii) which is subjected to (iii) does not comprise a source of Al, other than the zeolitic material provided in (i), preferably does not comprise a source of X, more preferably does not comprise a source of Al, B, Ga, In or a combination thereof, other than the zeolitic material provided in (i).

49. The process of any one of embodiments 46 to 48, wherein in the framework structure of the zeolitic material obtained in (iii), the molar ratio X:Y, calculated as $X_2O_3$:$YO_2$, is at least 0.01:1, preferably at least 0.02:1, more preferably at least 0.03:1, more preferably at least 0.04:1, more preferably at least 0.05:1.

50. The process of embodiment 49, wherein in the framework structure of the zeolitic material obtained in (iii), the molar ratio X:Y, calculated as $X_2O_3$:$YO_2$, is in the range of from 0.01:1 to 0.23:1, preferably in the range of from 0.02:1 to 0.21:1, more preferably in the range of from 0.03:1 to 0.19:1, more preferably in the range of from 0.04:1 to 0.17:1, more preferably in the range of from 0.05:1 to 0.15:1, more preferably in the range of from 0.06:1 to 0.13:1, more preferably in the range of from 0.07:1 to 0.11:1.

51. The process of embodiment 49, wherein in the framework structure of the zeolitic material obtained in (iii), the molar ratio X:Y, calculated as $X_2O_3$:$YO_2$, is in the range of from 0.01:1 to 0.17:1, preferably in the range of from 0.02:1 to 0.15:1, more preferably in the range of from 0.03:1 to 0.13:1, more preferably in the range of from 0.04:1 to 0.11:1, more preferably in the range of from 0.05:1 to 0.09:1.

52. The process of any one of embodiments 1 to 51, further comprising
(vii) supporting a metal M on the zeolitic material, preferably on the zeolitic material obtained from (vi).

53. The process of embodiment 52, wherein (vii) comprises
(vii.1) preparing a mixture comprising the zeolitic material, preferably the zeolitic material obtained from (vi), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;
(vii.2) heating the mixture prepared in (vii.1) to a temperature in the range of from 30 to 90° C., preferably in the range of from 40 to 80° C.;
(vii.3) preferably cooling, more preferably rapid-cooling the mixture obtained from (vii.2);
(vii.4) separating the zeolitic material comprising the metal M from the mixture obtained from (vii.2) or (vii.3), preferably from (vii.3), the separating preferably comprising washing the zeolitic material comprising the metal M;
(vii.5) preferably drying the zeolitic material comprising the metal M obtained from (vii.4) in a gas atmosphere, preferably at a temperature of the gas atmosphere in the range of from 90 to 200° C., more preferably in the range of from 100 to 150° C., wherein the gas atmosphere preferably comprises oxygen;
(vii.6) preferably calcining the zeolitic material comprising the metal M obtained from (vii.4) or (vii.5), preferably (vii.5), in a gas atmosphere, preferably at a temperature of the gas atmosphere in the range of from 350 to 600° C., more preferably in the range of from 400 to 550° C., wherein the gas atmosphere preferably comprises oxygen.

54. The process of embodiment 52 or 53, wherein the metal M is a transition metal of groups 7 to 12 of the periodic system of elements.

55. The process of embodiment 54, wherein the metal M is one or more of Fe, Co, Ni, Cu, and Zn, preferably one or more of Fe and Cu.

56. The process of embodiment 55, wherein the metal M comprises, preferably is Cu.

57. The process of any one of embodiments 52 to 56, wherein according to (vii), the metal M is supported on the zeolitic material in an amount in the range of from 0.1 to 5 weight-%, preferably in the range of from 0.2 to 4 weight-%, more preferably in the range of from 0.5 to 3 weight-%, calculated as elemental M and based on the total weight of the zeolitic material.

58. A zeolitic material having framework type AEI and having a framework structure which comprises a tetravalent element Y, a trivalent element X, and oxygen, obtainable or obtained or preparable or prepared by a process according to any one of embodiments 1 to 51.

59. A zeolitic material comprising a metal M, having framework type AEI and having a framework structure which comprises a tetravalent element Y, a trivalent element X, and oxygen, obtainable or obtained or preparable or prepared by a process according to any one of embodiments 52 to 57.

60. The zeolitic material of embodiment 58 or 59, having a total amount of acid sites in the range of from 1.0 to 2.0 mmol/g, wherein the total amount of acid sites is defined as the total molar amount of desorbed ammonia per mass of the zeolitic material determined according to the temperature programmed desorption of ammonia (NH3-TPD) as described in Reference Example 1.6 herein; wherein the zeolitic material has an amount of medium acid sites in the range of from 0.1 to 0.8 mmol/g, wherein the amount of medium acid sites is defined as the amount of desorbed ammonia per mass of the zeolitic material determined according to the temperature programmed desorption of ammonia (NH3-TPD) as described in Reference Example 1.6 herein in the temperature range of from 250 to 500° C.

61. Use of a zeolitic material according to any one of embodiments 58 to 60 as a catalytically active material, as a catalyst, or as a catalyst component.

62. The use of embodiment 61 for the selective catalytic reduction of nitrogen oxides in an exhaust gas stream, preferably an exhaust gas stream from a diesel engine.

63. The use of embodiment 61 for the conversion of a C1 compound to one or more olefins, preferably for the conversion of methanol to one or more olefins or the conversion of a synthetic gas comprising carbon monoxide and hydrogen to one or more olefins.

64. A method for selectively catalytically reducing nitrogen oxides in an exhaust gas stream, preferably an exhaust gas stream from a diesel engine, said method comprising bringing said exhaust gas stream in contact with a catalyst comprising the zeolitic material according to any one of embodiments 58 to 60.

65. A method for selectively catalytically reducing nitrogen oxides in an exhaust gas stream, preferably an exhaust gas stream from a diesel engine, said method comprising preparing a zeolitic material having framework type AEI and having a framework structure which comprises a tetravalent element Y, a trivalent element X, and oxygen by a process according to any one of embodiments 1 to 57, preferably 52 to 57, and bringing said exhaust gas stream in contact with a catalyst comprising said zeolitic material.

66. A method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the zeolitic material according to any one of embodiments 58 to 60.

67. A method for catalytically converting a C1 compound to one or more olefins, preferably converting methanol to one or more olefins or converting a synthetic gas comprising carbon monoxide and hydrogen to one or more olefins, said method comprising preparing a zeolitic material having framework type AEI and having a framework structure which comprises a tetravalent element Y, a trivalent element X, and oxygen by a process according to any one of embodiments 1 to 57, preferably 52 to 57, and bringing said C1 compound in contact with a catalyst comprising said zeolitic material.

68. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the zeolitic material according to any one of embodiments 58 to 60.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a composition comprising a zeolitic material having framework type AEI and having a framework structure which comprises a tetravalent element Y, a trivalent element X, and oxygen, said process comprising
    (i) providing a zeolitic material having framework type CHA and having a framework structure comprising the tetravalent element Y, the trivalent element X, and oxygen;
    (ii) preparing a synthesis mixture comprising the zeolitic material provided in (i), water, a source of the tetravalent element Y other than the zeolitic material provided in (i), and an AEI framework structure directing agent;
    (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining a mixture comprising the zeolitic material having framework type AEI;
    wherein Y is one or more of Si, Ge, Sn, Ti, Zr;
    wherein X is one or more of Al, B, Ga, In;
    wherein in the framework structure of the zeolitic material provided in (i), the molar ratio Y:X, calculated as $YO_2:X_2O_3$, is at most 20:1.

2. The process of embodiment 1, wherein Y is Si.
3. The process of embodiment 1 or 2, wherein X is Al.
4. The process of any one of embodiments 1 to 3, wherein Y is Si and X is Al.
5. The process of any one of embodiments 1 to 4, wherein at least 95 weight-%, preferably at least 98 weight-%, more preferably at least 99 weight-%, more preferably at least 99.5 weight-% of the framework of the zeolitic material provided in (i) consist of Y, X, O, and H.
6. The process of any one of embodiments 1 to 5, wherein the zeolitic material provided in (i) does not comprise Cu, preferably does not comprise one or more of Cu and Fe, more preferably does not comprise one or more of Fe, Co, Ni, Cu, and Zn, more preferably does not comprise a metal M other than Y and X if Y or X is a metal.
7. The process of any one of embodiments 1 to 5, wherein the content of the zeolitic material provided in (i) with regard to Cu, calculated as element, preferably with regard to one or more of Cu and Fe, each calculated as element, more preferably with regard to one or more of Fe, Co, Ni, Cu, and Zn, each calculated as element, more preferably with regard to a metal M, calculated as element, other than Y and X if Y or X is a metal, is at most 500 weight-ppm, preferably at most 100 weight-ppm, based on the total weight of the zeolitic material.
8. The process of any of embodiments 1 to 7, wherein in the framework structure of the zeolitic material provided in (i), the molar ratio Y:X, calculated as $YO_2:X_2O_3$, is in the range of from 3:1 to 20:1, preferably in the range of from 4:1 to 15:1.
9. The process of embodiment 8, wherein in the framework structure of the zeolitic material provided in (i), the molar ratio Y:X, calculated as $YO_2:X_2O_3$, is in the range of from 5:1 to 10:1.
10. The process of any one of embodiments 1 to 9, wherein the zeolitic material provided in (i) is a calcined zeolitic material, preferably a zeolitic material calcined in a gas atmosphere at a temperature of the gas atmosphere in the range of from 350 to 600° C., preferably in the range of from 400 to 550° C., wherein the gas atmosphere preferably comprises oxygen.
11. The process of any one of embodiments 1 to 10, wherein the zeolitic material provided in (i) is in its H form.
12. The process of any one of embodiments 1 to 11, wherein the synthesis mixture prepared in (ii) which is subjected to (iii) does not comprise a zeolitic material having framework type AEI.
13. The process of any one of embodiments 1 to 12, wherein the synthesis mixture prepared in (ii) which is subjected to (iii) does not contain a zeolitic seed material having framework type AEI.
14. The process of any one of embodiments 1 to 13, wherein Y is Si and the source of the tetravalent element Y according to (ii) comprises one or more of a wet-process silica, a dry-process silica, and a colloidal silica.
15. The process of any one of embodiments 1 to 14, wherein Y is Si and the source of the tetravalent element Y according to (ii) comprises, preferably is a colloidal silica.
16. The process of any one of embodiments 1 to 15, wherein the AEI framework structure directing agent comprises one or more quaternary phosphonium cation containing compounds and/or one or more quaternary ammonium cation containing compounds;
    wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1$-$C_6)$alkyl, preferably (C$_1$-C$_5$)alkyl, more preferably (C$_1$-C$_4$)alkyl, more preferably (C$_2$-C$_3$)alkyl, and even more preferably for optionally substituted methyl or ethyl, wherein even more preferably R$^1$, R$^2$, R$^3$, and R$^4$ stand for optionally substituted ethyl, preferably unsubstituted ethyl;

wherein the one or more quaternary ammonium cation containing compounds comprise one or more N,N-dialkyl-dialkylpiperidinium cation containing compounds, preferably one or more N,N—(C$_1$-C$_3$)dialkyl-(C$_1$-C$_3$)dialkylpiperidinium cation containing compounds, more preferably one or more N,N—(C$_1$-C$_2$)dialkyl-(C$_1$-C$_2$)dialkylpiperidinium cation containing compounds, wherein more preferably, the one or more quaternary ammonium cation containing compounds are selected from the group consisting of N,N—(C$_1$-C$_2$)dialkyl-2,6-(C$_1$-C$_2$)dialkylpiperidinium cation and N,N—(C$_1$-C$_2$)dialkyl-3,5-(C$_1$-C$_2$)dialkylpiperidinium cation containing compounds, more preferably from the group consisting of N,N-dimethyl-2,6-(C$_1$-C$_2$)dialkylpiperidinium cation and N,N-dimethyl-3,5-(C$_1$-C$_2$)dialkylpiperidinium cation containing compounds, more preferably from the group consisting of N,N-dimethyl-2,6-dimethylpiperidinium cation and N,N-dimethyl-3,5-dimethylpiperidinium cation containing compounds;

wherein the one or more quaternary phosphonium cation containing compounds and/or the one or more quaternary ammonium cation containing compounds are salts, preferably selected from the group consisting of halides, preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, and even more preferably hydroxides.

17. The process of any one of embodiments 1 to 16, wherein the AEI framework structure directing agent comprises, preferably is N,N-dimethyl-3,5-dimethylpiperidinium hydroxide.

18. The process of any one of embodiments 1 to 17, wherein in the synthesis mixture prepared in (ii) which is subjected to (iii), the weight ratio of the zeolitic material relative to the source of the tetravalent element Y, calculated as YO$_2$, is in the range of from 1.0:1 to 3.0:1, preferably in the range of from 1.5:1 to 2.5, more preferably in the range of from 2.0:1 to 2.2:1.

19. The process of any one of embodiments 1 to 18, wherein in the synthesis mixture prepared in (ii) which is subjected to (iii), the weight ratio of the zeolitic material relative to the water is in the range of from 0.005:1 to 0.030:1, preferably in the range of from 0.010:1 to 0.025:1, more preferably in the range of from 0.015:1 to 0.020:1.

20. The process of any one of embodiments 1 to 19, wherein in the synthesis mixture prepared in (ii) which is subjected to (iii), the weight ratio of the zeolitic material relative to the AEI framework structure directing agent is in the range of from 0.1:1 to 0.9:1, preferably in the range of from 0.3:1 to 0.7:1, more preferably in the range of from 0.4:1 to 0.5:1.

21. The process of any one of embodiments 1 to 20, wherein the synthesis mixture prepared in (ii) which is subjected to (iii) additionally comprises a source of a base, preferably a source of hydroxide.

22. The process of any one of embodiments 1 to 21, wherein the synthesis mixture prepared in (ii) which is subjected to (iii) additionally comprises a source of one or more of an alkali metal and an alkaline earth metal, preferably an alkali metal, more preferably sodium.

23. The process of embodiment 21 or 22, wherein the source of a base is the source of one or more of an alkali metal and an alkaline earth metal, preferably an alkali metal base, more preferably an alkali metal hydroxide, more preferably sodium hydroxide.

24. The process of any one of embodiments 21 to 23, wherein in the synthesis mixture prepared in (ii) which is subjected to (iii), the weight ratio of the zeolitic material relative to the source of a base is in the range of from 0.1:1 to 1.0:1, preferably in the range of from 0.2:1 to 0.8:1, more preferably in the range of from 0.3:1 to 0.6:1.

25. The process of any one of embodiments 1 to 24, wherein the synthesis mixture prepared in (ii) which is subjected to (iii) does not comprise a source of Cu, preferably a source of one or more of Cu and Fe, more preferably a source of one or more of Fe, Co, Ni, Cu, and Zn, more preferably a source of a metal M other than Y and X if Y or X is a metal.

26. The process of any one of embodiments 1 to 25, wherein the synthesis mixture prepared in (ii) which is subjected to (iii) does not comprise a source of fluoride, preferably does not comprise a source of halide.

27. The process of any one of embodiments 1 to 26, wherein the synthesis mixture prepared in (ii) which is subjected to (iii) does not comprise a source of Al, other than the zeolitic material provided in (i), preferably does not comprise a source of X, more preferably does not comprise a source of Al, B, Ga, In or a combination thereof, other than the zeolitic material provided in (i).

28. The process of any one of embodiments 1 to 27, wherein at least 95 weight-%, preferably at least 98 weight-%, more preferably at least 99 weight-% of the synthesis mixture prepared in (ii) which is subjected to (iii) consist of the zeolitic material provided in (i), the water, the source of the tetravalent element Y, the AEI framework structure directing agent, and preferably the source of a base and the source of one or more of an alkali metal and an alkaline earth metal.

29. The process of any one of embodiments 1 to 28, wherein the hydrothermal synthesis is carried out under autogenous pressure, preferably in an autoclave.

30. The process of any one of embodiments 1 to 29, wherein the synthesis mixture prepared in (ii) is heated in the autoclave to the hydrothermal synthesis temperature at a heating rate in the range of from 0.5 to 4 K/min, preferably in the range of from 1 to 3 K/min.

31. The process of any one of embodiments 1 to 30, wherein the hydrothermal synthesis temperature is in the range of from 110 to 175° C., preferably in the range of from 120 to 150° C.

32. The process of any one of embodiments 1 to 31, wherein the hydrothermal synthesis conditions comprise stirring the synthesis mixture.

33. The process of any one of embodiments 1 to 32, wherein the hydrothermal synthesis conditions comprise a hydrothermal synthesis time in the range of from 2 to 120 h, preferably in the range of from 20 to 100 h, more preferably in the range of from 40 to 80 h.

34. The process of any one of embodiments 1 to 33, further comprising
 (iv) cooling the mixture obtained from (iii), preferably to a temperature in the range of from 10 to 50° C., more preferably in the range of from 20 to 35° C.
35. The process of any one of embodiments 1 to 34, further comprising
 (v) separating a composition comprising a zeolitic material having framework type AEI and having a framework structure which comprises a tetravalent element Y, a trivalent element X, and oxygen from the mixture obtained from (iii) or (iv).
36. The process of embodiment 35, wherein (v) comprises
 (v.1) subjecting the mixture obtained from (iii) or (iv) to a solid-liquid separation method, preferably comprising a filtration method or a spraying method, obtaining a composition comprising a zeolitic material having framework type AEI and having a framework structure which comprises a tetravalent element Y, a trivalent element X, and oxygen;
 (v.2) preferably washing the composition obtained from (v.1);
 (v.3) drying the composition obtained from (v.1) or (v.2), preferably (v.2).
37. The process of embodiment 36, wherein according to (v.2), the composition is washed with water, preferably until the washing water has a conductivity of at most 500 microSiemens, preferably at most 200 microSiemens.
38. The process of embodiment 36 or 37, wherein according to (v.3), the composition is dried in a gas atmosphere having a temperature in the range of from 80 to 175° C., preferably in the range of from 100 to 150° C.
39. The process of embodiment 38, wherein the gas atmosphere comprises oxygen, preferably is air, lean air, or synthetic air.
40. The process of any one of embodiments 35 to 39, further comprising
 (vi) calcining the composition obtained from (v).
41. The process of embodiment 40, wherein according to (vi), the composition is calcined in a gas atmosphere having a temperature in the range of from 400 to 600° C., preferably in the range of from 450 to 550° C.
42. The process of embodiment 41, wherein the gas atmosphere comprises oxygen, preferably is air, lean air, or synthetic air.
43. The process of any one of embodiments 1 to 42, wherein in the framework structure of the zeolitic material obtained in (iii), the molar ratio X:Y, calculated as $X_2O_3$:$YO_2$, is at least 0.01:1, preferably at least 0.02:1, more preferably at least 0.03:1, more preferably at least 0.04:1, more preferably at least 0.05:1.
44. The process of embodiment 43, wherein in the framework structure of the zeolitic material obtained in (iii), the molar ratio X:Y, calculated as $X_2O_3$:$YO_2$, is in the range of from 0.01:1 to 0.23:1, preferably in the range of from 0.02:1 to 0.21:1, more preferably in the range of from 0.03:1 to 0.19:1, more preferably in the range of from 0.04:1 to 0.17:1, more preferably in the range of from 0.05:1 to 0.15:1, more preferably in the range of from 0.06:1 to 0.13:1, more preferably in the range of from 0.07:1 to 0.11:1.
45. The process of embodiment 43, wherein in the framework structure of the zeolitic material obtained in (iii), the molar ratio X:Y, calculated as $X_2O_3$:$YO_2$, is in the range of from 0.01:1 to 0.17:1, preferably in the range of from 0.02:1 to 0.15:1, more preferably in the range of from 0.03:1 to 0.13:1, more preferably in the range of from 0.04:1 to 0.11:1, more preferably in the range of from 0.05:1 to 0.09:1.
46. A process for preparing a composition comprising a zeolitic material having framework type AEI and having a framework structure which comprises a tetravalent element Y, a trivalent element X, and oxygen, preferably the process of any one of embodiments 1 to 10, said process comprising
 (i) providing a zeolitic material having framework type CHA and having a framework structure comprising the tetravalent element Y, the trivalent element X, and oxygen;
 (ii) preparing a synthesis mixture comprising the zeolitic material provided in (i), water, a source of the tetravalent element Y other than the zeolitic material provided in (i), and an AEI framework structure directing agent;
 (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining a mixture comprising the zeolitic material having framework type AEI;
 (iv) cooling the mixture obtained from (iii), preferably to a temperature in the range of from 10 to 50° C., more preferably in the range of from 20 to 35° C.;
 (v) separating a composition comprising a zeolitic material having framework type AEI and having a framework structure which comprises a tetravalent element Y, a trivalent element X, and oxygen from the mixture obtained from (iv), comprising
  (v.1) subjecting the mixture obtained from (iv) to a solid-liquid separation method, preferably comprising a filtration method or a spraying method;
  (v.2) washing the composition obtained from (v.1);
  (v.3) drying the composition obtained from (v.2) in a gas atmosphere having a temperature in the range of from 80 to 175° C.;
 (vi) calcining the composition obtained from (v) in a gas atmosphere having a temperature in the range of from 400 to 600° C.;
 wherein Y is Si and X is Al, and wherein the molar ratio Y:X, calculated as $YO_2$:$X_2O_3$, is at most 20:1.
47. The process of embodiment 46, wherein the synthesis mixture prepared in (ii) which is subjected to (iii) does not comprise a source of fluoride, preferably does not comprise a source of halide.
48. The process of embodiment 46 or 47, wherein the synthesis mixture prepared in (ii) which is subjected to (iii) does not comprise a source of Al, other than the zeolitic material provided in (i), preferably does not comprise a source of X, more preferably does not comprise a source of Al, B, Ga, In or a combination thereof, other than the zeolitic material provided in (i).
49. The process of any one of embodiments 46 to 48, wherein in the framework structure of the zeolitic material obtained in (iii), the molar ratio X:Y, calculated as $X_2O_3$:$YO_2$, is at least 0.01:1, preferably at least 0.02:1, more preferably at least 0.03:1, more preferably at least 0.04:1, more preferably at least 0.05:1.
50. The process of embodiment 49, wherein in the framework structure of the zeolitic material obtained in (iii), the molar ratio X:Y, calculated as $X_2O_3$:$YO_2$, is in the range of from 0.01:1 to 0.23:1, preferably in the range of from 0.02:1 to 0.21:1, more preferably in the range of from 0.03:1 to 0.19:1, more preferably in the range of from 0.04:1 to 0.17:1, more preferably in the range of from 0.05:1 to 0.15:1, more preferably in the range of from 0.06:1 to 0.13:1, more preferably in the range of from 0.07:1 to 0.11:1.

51. The process of embodiment 49, wherein in the framework structure of the zeolitic material obtained in (iii), the molar ratio X:Y, calculated as $X_2O_3$:$YO_2$, is in the range of from 0.01:1 to 0.17:1, preferably in the range of from 0.02:1 to 0.15:1, more preferably in the range of from 0.03:1 to 0.13:1, more preferably in the range of from 0.04:1 to 0.11:1, more preferably in the range of from 0.05:1 to 0.09:1.

52. The process of any one of embodiments 1 to 51, wherein more than 50 weight-%, preferably at least 60 weight-%, more preferably at least 70 weight-% of the composition comprising a zeolitic material having framework type AEI and having a framework structure which comprises a tetravalent element Y, a trivalent element X, and oxygen, consist of the zeolitic material having framework type AEI and having a framework structure which comprises a tetravalent element Y, a trivalent element X, and oxygen.

53. The process of embodiment 52, wherein at least 75 weight-%, preferably at least 85 weight-%, more preferably at least 90 weight-% of the composition comprising a zeolitic material having framework type AEI and having a framework structure which comprises a tetravalent element Y, a trivalent element X, and oxygen, consist of the zeolitic material having framework type AEI and having a framework structure which comprises a tetravalent element Y, a trivalent element X, and oxygen.

54. The process of embodiment 52 or 53, wherein at least 90 weight-%, preferably at least 95 weight-%, more preferably at least 99 weight-% of the composition consist of the zeolitic material having framework type AEI and having a framework structure which comprises a tetravalent element Y, a trivalent element X, and oxygen, and a zeolitic material having framework type CHA and having a framework structure which comprises a tetravalent element Y, a trivalent element X, and oxygen.

55. The process of any one of embodiments 1 to 54, further comprising
    (vii) supporting a metal M on the composition comprising a zeolitic material having framework type AEI and having a framework structure which comprises a tetravalent element Y, a trivalent element X, and oxygen preferably on the composition comprising a zeolitic material having framework type AEI and having a framework structure which comprises a tetravalent element Y, a trivalent element X, and oxygen, obtained from (vi).

56. The process of embodiment 55, wherein (vii) comprises
    (vii.1) preparing a mixture comprising the composition comprising a zeolitic material having framework type AEI and having a framework structure which comprises a tetravalent element Y, a trivalent element X, and oxygen preferably the composition comprising a zeolitic material having framework type AEI and having a framework structure which comprises a tetravalent element Y, a trivalent element X, and oxygen, obtained from (vi), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;
    (vii.2) heating the mixture prepared in (vii.1) to a temperature in the range of from 30 to 90° C., preferably in the range of from 40 to 80° C.;
    (vii.3) preferably cooling, more preferably rapid-cooling the mixture obtained from (vii.2);
    (vii.4) separating the composition comprising the metal M from the mixture obtained from (vii.2) or (vii.3), preferably from (vii.3), the separating preferably comprising washing the composition comprising the metal M;
    (vii.5) preferably drying the composition comprising the metal M obtained from (vii.4) in a gas atmosphere, preferably at a temperature of the gas atmosphere in the range of from 90 to 200° C., more preferably in the range of from 100 to 150° C., wherein the gas atmosphere preferably comprises oxygen;
    (vii.6) preferably calcining the composition comprising the metal M obtained from (vii.4) or (vii.5), preferably (vii.5), in a gas atmosphere, preferably at a temperature of the gas atmosphere in the range of from 350 to 600° C., more preferably in the range of from 400 to 550° C., wherein the gas atmosphere preferably comprises oxygen.

57. The process of embodiment 55 or 56, wherein the metal M is a transition metal of groups 7 to 12 of the periodic system of elements.

58. The process of embodiment 57, wherein the metal M is one or more of Fe, Co, Ni, Cu, and Zn, preferably one or more of Fe and Cu.

59. The process of embodiment 58, wherein the metal M comprises, preferably is Cu.

60. The process of any one of embodiments 55 to 59, wherein according to (vii), the metal M is supported on the composition in an amount in the range of from 0.1 to 5 weight-%, preferably in the range of from 0.2 to 4 weight-%, more preferably in the range of from 0.5 to 3 weight-%, calculated as elemental M and based on the total weight of the composition.

61. A composition comprising a zeolitic material having framework type AEI and having a framework structure which comprises a tetravalent element Y, a trivalent element X, and oxygen, obtainable or obtained or preparable or prepared by a process according to any one of embodiments 1 to 54.

62. A composition comprising a zeolitic material having framework type AEI and having a framework structure which comprises a tetravalent element Y, a trivalent element X, and oxygen, obtainable or obtained or preparable or prepared by a process according to any one of embodiments 55 to 60.

63. The composition of embodiment 61 or 62, having a total amount of acid sites in the range of from 1.0 to 2.0 mmol/g, wherein the total amount of acid sites is defined as the total molar amount of desorbed ammonia per mass of composition determined according to the temperature programmed desorption of ammonia (NH3-TPD) as described in Reference Example 1.6 herein; wherein the composition has an amount of medium acid sites in the range of from 0.1 to 0.8 mmol/g, wherein the amount of medium acid sites is defined as the amount of desorbed ammonia per mass of the composition determined according to the temperature programmed desorption of ammonia (NH3-TPD) as described in Reference Example 1.6 herein in the temperature range of from 250 to 500° C.

64. Use of a composition according to any one of embodiments 61 to 63 as a catalytically active material, as a catalyst, or as a catalyst component.

65. The use of embodiment 64 for the selective catalytic reduction of nitrogen oxides in an exhaust gas stream, preferably an exhaust gas stream from a diesel engine.
66. The use of embodiment 64 for the conversion of a C1 compound to one or more olefins, preferably for the conversion of methanol to one or more olefins or the conversion of a synthetic gas comprising carbon monoxide and hydrogen to one or more olefins.
67. A method for selectively catalytically reducing nitrogen oxides in an exhaust gas stream, preferably an exhaust gas stream from a diesel engine, said method comprising bringing said exhaust gas stream in contact with a catalyst comprising the composition according to any one of embodiments 61 to 63.
68. A method for selectively catalytically reducing nitrogen oxides in an exhaust gas stream, preferably an exhaust gas stream from a diesel engine, said method comprising preparing a composition comprising a zeolitic material having framework type AEI and having a framework structure which comprises a tetravalent element Y, a trivalent element X, and oxygen by a process according to any one of embodiments 1 to 60, preferably 55 to 60, and bringing said exhaust gas stream in contact with a catalyst comprising said composition.
69. A method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the composition according to any one of embodiments 61 to 63.
70. A method for catalytically converting a C1 compound to one or more olefins, preferably converting methanol to one or more olefins or converting a synthetic gas comprising carbon monoxide and hydrogen to one or more olefins, said method comprising preparing a composition comprising a zeolitic material having framework type AEI and having a framework structure which comprises a tetravalent element Y, a trivalent element X, and oxygen by a process according to any one of embodiments 1 to 60, preferably 55 to 60, and bringing said C1 compound in contact with a catalyst comprising said composition.
71. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the composition according to any one of embodiments 61 to 63.

The present invention is further illustrated by the following examples, comparative examples, and reference examples.

EXAMPLES

Reference Example 1.1

Determination of the Crystallinity

The crystallinity of the zeolitic materials according to the present invention was determined by XRD analysis. The data were collected using a standard Bragg-Brentano diffractometer with a Cu-X-ray source and an energy dispersive point detector. The angular range of 2° to 70° (2 theta) was scanned with a step size of 0.02°, while the variable divergence slit was set to a constant opening angle of 0.3°. The data were then analyzed using TOPAS V5 software, wherein the sharp diffraction peaks were modeled using PONKCS phases for AEI and FAU and the crystal structure for CHA. The model was prepared as described in Madsen, I. C. et al. This was refined to fit the data. An independent peak was inserted at the angular position 28°. This was used to describe the amorphous content. The crystalline content describes the intensity of the crystalline signal to the total scattered intensity. Included in the model were also a linear background, Lorentz and polarization corrections, lattice parameters, space group and crystallite size.

Reference Example 1.2

Determination of the BET Specific Surface Area

The BET specific surface area was determined according to ISO 9277, second edition 2010, via nitrogen physisorption at 77 K.

Reference Example 1.3

Determination of the C Value

The C value (BET parameter) was determined as described in ISO 9277, second edition 2010, section 7.2.

Reference Example 1.4

Determination of the XRD Patterns

The XRD diffraction patterns were determined as described in Reference Example 1.1.

Reference Example 1.5

Scanning Electron Microscopy

The SEM (Scanning Electron Microscopy) pictures (secondary electron (SE) picture at 15 kV (kiloVolt)) were made using a Hitachi TM3000.

Reference Example 1.6

Temperature Programmed Desorption of Ammonia (NH$_3$-TPD)

The temperature-programmed desorption of ammonia (NH$_3$-TPD) was conducted in an automated chemisorption analysis unit (Micromeritics AutoChem II 2920) having a thermal conductivity detector. Continuous analysis of the desorbed species was accomplished using an online mass spectrometer (OmniStar QMG200 from Pfeiffer Vacuum). The sample (0.1 g) was introduced into a quartz tube and analysed using the program described below. The temperature was measured by means of a Ni/Cr/Ni thermocouple immediately above the sample in the quartz tube. For the analyses, He of purity 5.0 was used. Before any measurement, a blank sample was analysed for calibration.

1. Preparation: Commencement of recording; one measurement per second. Wait for 10 minutes at 25° C. and a He flow rate of 30 cm$^3$/min (room temperature (about 25° C.) and 1 atm); heat up to 600° C. at a heating rate of 20 K/min; hold for 10 minutes. Cool down under a He flow (30 cm$^3$/min) to 100° C. at a cooling rate of 20 K/min (furnace ramp temperature); Cool down under a He flow (30 cm³/min) to 100° C. at a cooling rate of 3 K/min (sample ramp temperature).
2. Saturation with $NH_3$: Commencement of recording; one measurement per second. Change the gas flow to a mixture of 10% $NH_3$ in He (75 cm³/min; 100° C. and 1 atm) at 100° C.; hold for 30 minutes.
3. Removal of the excess: Commencement of recording; one measurement per second. Change the gas flow to a He flow of 75 cm³/min (100° C. and 1 atm) at 100° C.; hold for 60 min.
4. $NH_3$-TPD: Commencement of recording; one measurement per second. Heat up under a He flow (flow rate: 30 cm³/min) to 600° C. at a heating rate of 10 K/min; hold for 30 minutes.
5. End of measurement.

Desorbed ammonia was measured by means of the online mass spectrometer, which demonstrates that the signal from the thermal conductivity detector was caused by desorbed ammonia. This involved utilizing the m/z=16 signal from ammonia in order to monitor the desorption of the ammonia. The amount of ammonia adsorbed (mmol/g of sample) was ascertained by means of the Micromeritics software through integration of the TPD signal with a horizontal baseline.

Reference Example 1.7

Determination of the Water Uptake

The water adsorption/desorption isotherms measurements were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heating ramp of 5° C./min) and holding it for 6 h under a $N_2$ flow. After the drying program, the temperature in the cell was decreased to 25° C. and kept isothermal during the measurements. The microbalance was calibrated, and the weight of the dried sample was balanced (maximum mass deviation 0.01 weight-%). Water uptake by the sample was measured as the increase in weight over that of the dry sample. First, an adsorption curve was measured by increasing the relative humidity (RH) (expressed as weight-% water in the atmosphere inside of the cell) to which the samples was exposed and measuring the water uptake by the sample at equilibrium. The RH was increased with a step of 10% from 5% to 85% and at each step the system controlled the RH and monitored the sample weight until reaching the equilibrium conditions and recording the weight uptake. The total adsorbed water amount by the sample was taken after the sample was exposed to the 85% RH. During the desorption measurement the RH was decreased from 85% to 5% with a step of 10% and the change in the weight of the sample (water uptake) was monitored and recorded.

Example 1

Preparation of a Zeolitic Material Having Framework Type AEI a) Providing a CHA zeolitic material A CHA zeolitic material (sodium form) was prepared according to the template-free synthesis method as described in WO 2013/068976 A, in Example 2, page 43, line 29 to page 44, line 8.

The zeolitic material had a silica:alumina ratio ($SiO_2$:$Al_2O_3$) of 9:1.

b) Preparing an AEI zeolitic material

Materials used:
NaOH (aqueous solution; 50 weight-%): 70.73 g
De-ionized water: 770.71 g
1,1,3,5-tetramethylpiperidinium OH (Sachem; aq. mixture, 19.77 weight-%): 196.18 g
Ludox® AS40 (Grace; colloidal silica; aqueous solution, 40 weight-%): 219.80 g
CHA zeolitic material, according to a) above: 16.40 g A beaker was filled with 670.71 g de-ionized water, and under stirring, the NaOH solution was added. Then, the template compound (1,1,3,5-tetramethylpiperidinium hydroxide) was added under stirring, followed by adding the CHA zeolitic material under stirring. This mixture was further stirred for 1 h. Then, the colloidal silica solution was added under stirring and the resulting mixture was stirred for another 0.5 h. The obtained suspension was transferred to a 2.5 L autoclave, and the involved lines were rinsed with the remaining 100 g of the de-ionized water. Then, the autoclave was sealed.

Within 1 h, the mixture in the autoclave was heated to a temperature of 140° and kept at this crystallization temperature for 72 h under stirring at 250 rpm. After pressure release and cooling to room temperature, the obtained suspension was subjected to filtration using a nutsch-type filter and the filter cake was washed with de-ionized water until the washing water had a conductivity of less than 200 microSiemens. The thus washed zeolitic material was dried overnight at 120° C. under air in a convection oven, followed by heating at a heating rate of 2 K/min to a temperature of 500° C. and calcination at this temperature for 5 h. 15.4 g zeolitic material were obtained, the space-time yield was 73.95 kg/m³/d.

Elemental analysis of the zeolitic material, in weight-%: Si=35; Al=5.8; Na=3.5.

Accordingly, in the framework structure of the AEI zeolitic material obtained, the molar ratio Y:X, calculated as $YO_2$:$X_2O_3$, was 11.59:1, the molar ratio X:Y, calculated as $X_2O_3$:$YO_2$, was 0.086:1.

The crystallinity was 77%, determined as described in Reference Example 1.1. The BET specific surface area was 569 m²/g, determined as described in Reference Example 1.2. The C value was −66, determined as described in Reference Example 1.3. The XRD pattern, determined as described in Reference Example 1.4, is shown in FIG. 1. The SEM picture, determined as described in Reference Example 1.5, is shown in FIG. 2.

78% of the crystalline material was zeolitic material having framework type AEI, 22% of the material was zeolitic material having framework type CHA.

Example 2

Preparation of a Zeolitic Material Having Framework Type AEI a) Providing a CHA zeolitic material Provided was a naturally occurring CHA zeolitic material, obtained from ZMM-Zeofume, lot no. 311855, comprising, in weight-%: Si=26.1; Al=7.1; Na=3.5; Ca=1.3; K=0.8; Mg=0.9.

The zeolitic material had a silica:alumina ratio ($SiO_2$:$Al_2O_3$) of 7.4:1.

The BET specific surface area was 402 m²/g, determined as described in Reference Example 1.2. The Langmuir surface area was 525 m²/g. The crystallinity of the material was 65%, determined as described in Reference Example 1.1. The average particle size was 42 nm.

FIG. 5 shows the SEM picture of the zeolitic material, determined as described in Reference Example 1.5. FIG. 6 shows the XRD pattern of the zeolitic material, determined as described in Reference Example 1.4. FIG. 7 shows the water uptake isotherm of the zeolitic material, determined as described in Reference Example 1.7.

b) Preparing an AEI zeolitic material

Materials used:
NaOH (aqueous solution; 50 weight-%): 70.73 g
De-ionized water: 770.71 g
1,1,3,5-tetramethylpiperidinium OH (Sachem; aq. mixture, 19.77 weight-%): 196.18 g
Ludox® AS40 (Grace; colloidal silica; aqueous solution, 40 weight-%): 219.80 g
CHA zeolitic material, according to a) above: 16.40 g A beaker was filled with 670.71 g de-ionized water, and under stirring, the NaOH solution was added. Then, the template compound (1,1,3,5-tetramethylpiperidinium hydroxide) was added under stirring, followed by adding the CHA zeolitic material under stirring. This mixture was further stirred for 1 h. Then, the colloidal silica solution was added under stirring and the resulting mixture was stirred for another 0.5 h. The obtained suspension was transferred to a 2.5 L autoclave, and the involved lines were rinsed with the remaining 100 g of the de-ionized water. Then, the autoclave was sealed.

Within 1 h, the mixture in the autoclave was heated to a temperature of 140° and kept at this crystallization temperature for 72 h under stirring at 250 rpm. After pressure release and cooling to room temperature, the obtained suspension was subjected to filtration using a nutsch-type filter and the filter cake was washed with de-ionized water until the washing water had a conductivity of less than 200 micro-Siemens. The thus washed zeolitic material was dried overnight at 120° C. under air in a convection oven, followed by heating at a heating rate of 2 K/min to a temperature of 500° C. and calcination at this temperature for 5 h. 22.0 g zeolitic material were obtained, the space-time yield was 5.64 kg/m$^3$/d.

Elemental analysis of the zeolitic material, in weight-%: Si=34; Al=4.3; Na=2.3.

Accordingly, in the framework structure of the AEI zeolitic material obtained, the molar ratio Y:X, calculated as YO$_2$:X$_2$O$_3$, was 15.2:1, the molar ratio X:Y, calculated as X$_2$O$_3$:YO$_2$, was 0.066:1.

The crystallinity was 72%, determined as described in Reference Example 1.1. The BET specific surface area was 494 m$^2$/g, determined as described in Reference Example 1.2. The C value was −69, determined as described in Reference Example 1.3. The XRD pattern, determined as described in Reference Example 1.4, is shown in FIG. 3. The SEM picture, determined as described in Reference Example 1.5, is shown in FIG. 4.

94% of the crystalline material was zeolitic material having framework type AEI, 6% of the material was zeolitic material having framework type CHA.

Comparative Example 1

Attempt to Prepare a Zeolitic Material Having Framework Type AEI a) Providing a CHA zeolitic material A CHA zeolitic material was prepared according to Example 1 of WO 2013/182974 A1, on page 47, lines 1 to 18.

The zeolitic material had a silica:alumina ratio (SiO$_2$: Al$_2$O$_3$) of 22.4:1.

b) Trying to prepare an AEI material

Materials used:
NaOH (aqueous solution; 50 weight-%): 70.27 g
De-ionized water: 769.56 g
1,1,3,5-tetramethylpiperidinium OH (Sachem; aq. mixture, 19.77 weight-%): 197.96 g
Ludox® AS40 (Grace; colloidal silica; aqueous solution, 40 weight-%): 219.60 g
CHA zeolitic material, according to a) above: 16.40 g A beaker was filled with 670.7 g de-ionized water, and under stirring, the NaOH solution was added. Then, the template compound (1,1,3,5-tetramethylpiperidinium hydroxide) was added under stirring, followed by adding the CHA zeolitic material under stirring. This mixture was further stirred for 1 h. Then, the colloidal silica solution was added under stirring and the resulting mixture was stirred for another 0.5 h. The obtained suspension was transferred to a 2.5 L autoclave, and the involved lines were rinsed with the remaining de-ionized water. Then, the autoclave was sealed.

Within 1 h, the mixture in the autoclave was heated to a temperature of 140° and kept at this crystallization temperature for 72 h under stirring at 250 rpm. After pressure release and cooling to room temperature, the obtained suspension was subjected to filtration using a nutsch-type filter and the filter cake was washed with de-ionized water until the washing water had a conductivity of less than 200 micro-Siemens. The thus washed zeolitic material was dried overnight at 120° C. under air in a convection oven.

Elemental analysis of the dried sample, in weight-%: Si=1.1; Al=<0.03; Na=0.5.

XRD analysis of the dried material showed that the sample was amorphous, i.e. that the hydrothermal treatment describe above did not lead to crystallization.

Comparative Example 2

Attempt to Prepare a Zeolitic Material Having Framework Type AEI a) Providing a CHA zeolitic material 2,040 kg of water were placed in a stirring vessel and 3,924 kg of a solution of 1-adamantyltrimethylammonium hydroxide (20% aqueous solution) are added thereto under stirring. 415.6 kg of a solution of sodium hydroxide (20 weight-% aqueous solution) were then added, followed by 679 kg of aluminum triisopropylate (Dorox® D 10, Ineos), after which the resulting mixture was stirred for 5 min. 7800.5 kg of a solution of colloidal silica (40 weight-% aqueous solution; Ludox® AS40, Sigma Aldrich) were then added and the resulting mixture stirred for 15 min before being transferred to an autoclave. 1,000 kg of distilled water used for washing out the stirring vessel were added to the mixture in the autoclave, and the final mixture was then heated under stirring for 16 h at 170° C. The solid product was then filtered off and the filter cake washed with distilled water. The resulting filter cake was then dispersed in distilled water in a spray dryer mix tank to obtain a slurry with a solids concentration of approximately 24% and the spray-dried, wherein the inlet temperature was set to 477-482° C. and the outlet temperature was measured to be 127-129° C., thus affording a spray-dried powder of a zeolite having the CHA framework structure.

The resulting material had a BET specific surface area of 558 m$^2$/g, and a crystallinity of 105% as determined by powder X-ray diffraction. The sodium content of the product was determined to be 0.75 weight-% calculated as $Na_2O$.

The zeolitic material had a silica:alumina ratio ($SiO_2$:$Al_2O_3$) of 34:1.

FIG. 10 shows the SEM picture of the zeolitic material, determined as described in Reference Example 1.5.

b) Trying to prepare an AEI material

Materials used:
NaOH (aqueous solution; 50 weight-%): 70.73 g
De-ionized water: 770.71 g
Ludox® AS40 (Grace; colloidal silica; aqueous solution, 40 weight-%): 219.80 g
CHA zeolitic material, according to a) above: 16.40 g A beaker was filled with 670.7 g de-ionized water, and under stirring, the NaOH solution was added. Then, the template compound (1,1,3,5-tetramethylpiperidinium hydroxide) was added under stirring, followed by adding the CHA zeolitic material under stirring. This mixture was further stirred for 1 h. Then, the colloidal silica solution was added under stirring and the resulting mixture was stirred for another 0.5 h. The obtained suspension was transferred to a 2.5 L autoclave, and the involved lines were rinsed with the remaining de-ionized water. Then, the autoclave was sealed.

Within 1 h, the mixture in the autoclave was heated to a temperature of 140° and kept at this crystallization temperature for 72 h under stirring at 250 rpm. After pressure release and cooling to room temperature, the content of the autoclave was found to be completely liquid.

Therefore, the hydrothermal treatment described above did not lead to crystallization.

Comparative Example 3

Attempt to Prepare a Zeolitic Material Having Framework Type AEI a) Providing a zeolitic material having framework type CHA Provided was a commercial zeolitic material having framework type CHA from Zeolyst, having a silica:alumina ratio ($SiO_2$:$Al_2O_3$) of 38.0.

b) Preparing a zeolitic material having framework type BEA starting from the zeolitic material provided in a)

Materials used:
Sodium aluminate, Aldrich, CAS no. 1302-42-7: 24.75 g
Sodium silicate, Woellner, CAS no. 1344-09-8 555.27 g
Ludox® AS40 (Grace; colloidal silica; aqueous solution, 40 weight-%): 96.21 g
De-ionized water: 534.63 g
CHA zeolitic material, according to a) above: 18.28 g In a first vessel, the CHA zeolitic material was suspended in water under stirring at 100 rpm within 30 min. In a second vessel, the sodium aluminate was admixed with water and dissolved under stirring at 50 rpm within 30 min. The contents of the two vessels were combined under stirring at 50 rpm. The lines were rinsed with deionized water. Subsequently, the sodium silicate was added under stirring at 25 rpm and the lines were sensed with deionized water. Subsequently, the Ludox® AS40 was added under stirring at 25 rpm and the lines were sensed with deionized water. The mixture was heated under autogenous pressure within 3 h to a temperature of 120° C. and kept at this temperature under stirring at 25 rpm for 84 h. After cooling to room temperature, the resulting mixture was homogenized by further stirring at 60 rpm for 30 min. The resulting suspension was subjected to filtration using a nutsch-type filter and washed with deionized water until the washing water had a conductivity of less than 20 microSiemens. The resulting filter cake was dried overnight at 120° C. in a convection oven under air.

The BET specific surface area was 471 $m^2/g$, determined as described in Reference Example 1.2. The C value was −53, determined as described in Reference Example 1.3. Elemental analysis of the dried zeolitic material, in weight-%: Si=31.0; Al=5.6; Na=4.6.

c) Preparing the ammonium form of the zeolitic material having framework type BEA prepared in b)

100 g of the zeolitic material prepare in b) was admixed with 100 g of a 10 weight-% aqueous ammonium nitrate solution and stirred at 80° C. for 2 h. Using a nutsch-type filter, the filter cake was washed nitrate-free with deionized water. Ammonium nitrate treatment and washing were repeated once. The resulting filter cake was dried overnight at 120° C. under air. 90 g dried material were obtained.

Elemental analysis of the dried zeolitic material, in weight-%: Si=33.0; Al=6.0; Na=0.05.

d) Preparing the H form of the zeolitic material having framework type BEA prepared in c)

The zeolitic material prepared in c) was calcined at 500° C. for 5 h under air.

The zeolitic material had a silica:alumina ratio ($SiO_2$:$Al_2O_3$) of 10.6:1.

e) Preparing an AEI material

Materials used:
NaOH (aqueous solution; 50 weight-%): 70.73 g
De-ionized water: 770.71 g
1,1,3,5-tetramethylpiperidinium OH (Sachem; aq. mixture, 19.77 weight-%): 196.18 g
Ludox® AS40 (Grace; colloidal silica; aqueous solution, 40 weight-%): 219.80 g
BEA zeolitic material, according to d) above: 16.40 g A beaker was filled with 670.71 g de-ionized water, and under stirring, the NaOH solution was added. Then, the template compound (1,1,3,5-tetramethylpiperidinium hydroxide) was added under stirring, followed by adding the CHA zeolitic material under stirring. This mixture was further stirred for 1 h. Then, the colloidal silica solution was added under stirring and the resulting mixture was stirred for another 0.5 h. The obtained suspension was transferred to a 2.5 L autoclave, and the involved lines were rinsed with the remaining 100 g of the de-ionized water. Then, the autoclave was sealed.

Within 1 h, the mixture in the autoclave was heated to a temperature of 140° and kept at this crystallization temperature for 72 h under stirring at 250 rpm. After pressure release and cooling to room temperature, the obtained suspension was subjected to filtration using a nutsch-type filter and the filter cake was washed with de-ionized water until the washing water had a conductivity of less than 200 microSiemens. The thus washed zeolitic material was dried overnight at 120° C. under air in a convection oven, followed by heating at a heating rate of 2 K/min to a temperature of 500° C. and calcination at this temperature for 5 h. 19.8 g zeolitic material were obtained.

Elemental analysis of the zeolitic material, in weight-%: Si=36; Al=4.5; Na=2.1.

The crystallinity was 45%, determined as described in Reference Example 1.1. The BET specific surface area was 494 $m^2/g$, determined as described in Reference Example 1.2. The C value was −76, determined as described in Reference Example 1.3. The XRD pattern, determined as described in Reference Example 1.4, is shown in FIG. 8. The SEM picture, determined as described in Reference Example 1.5, is shown in FIG. 9.

Only 36% of the crystalline material was zeolitic material having framework type AEI, 61% of the material was a zeolitic material having framework type MOR, 4% were Gmelinite.

Example 3

Preparation of a Zeolitic Material Having Framework Type AEI and Comprising a Metal M (Cu)

The zeolitic material obtained from Example 1 (powder) was impregnated via incipient wetness with an aqueous Cu nitrate solution wherein the amount of Cu nitrate was chosen so that, in the finally obtained material containing Cu supported on the zeolitic material, was 4 weight-%, 5 weight-%, and 6 weight-%, calculated as CuO and based on the total weight of the finally obtained calcined zeolitic material having Cu supported thereon. After the impregnation, the material was dried and then calcined for 5 h at 450° C. Based on this powder material, molding were prepared by mixing the respective powder material with a milled alumina slurry (Puralox® TM 100/150) (weight ratio of zeolitic material:alumina=70:30). Under stirring, the moldings were dried and calcined for 1 h at 550° C. The moldings were then crushed and sieved to as particle size of 250-500 micrometer.

For the subsequent tests, respectively fresh and aged Cu containing material was used. For ageing, the crushed and sieved particles were subjected for 50 h to air comprising 10 weight-% water at 650° C., optionally followed by subjecting for 16 h to air comprising 10 weight-% water at 800° C.

Example 4

Preparation of a Zeolitic Material Having Framework Type AEI and Comprising a Metal M (Cu)

According to the method described in Example 3, fresh and aged Cu containing materials were prepared based on the zeolitic material obtained from Example 2 (powder).

Example 5

Use of the Zeolitic Material Having Framework Type AEI for Selectively Catalytically Reducing Nitrogen Oxides The zeolitic materials obtained from Examples 3 and 4 were subjected to a selective catalytic reduction test. For this purpose, the respectively obtained fresh and aged samples (170 mg each) were diluted with 1 mL corundum having the same particle size as the samples. A given sample was exposed to a feed stream (500 ppm NO, 500 ppm $NH_3$, 5% $H_2O$, 10% $O_2$, balance $N_2$) at a gas hourly space velocity of 80,000 $h^{-1}$, at temperatures of the feed stream of 200 and 575° C. The following results (see Table 1 below) were obtained:

TABLE 1

Results obtained from Example 5

| Example | Cu content of the zeolitic material, calculated as CuO/weight-% | Conditioning | NOx conversion at 200° C./% | NOx conversion at 575° C./% |
| --- | --- | --- | --- | --- |
| 3 | 4 | fresh | 85 | 99 |
| 3 | 5 | fresh | 89 | 99 |
| 3 | 6 | fresh | 90 | 94 |
| 3 | 4 | aged at 650° C. | 68 | 99 |
| 3 | 5 | aged at 650° C. | 82 | 99 |
| 3 | 6 | aged at 650° C. | 86 | 99 |
| 3 | 4 | aged at 800° C. | 44 | 92 |
| 3 | 5 | aged at 800° C. | 58 | 91 |
| 3 | 6 | aged at 800° C. | 65 | 96 |
| 4 | 4 | fresh | 63 | 98 |
| 4 | 6 | fresh | 72 | 90 |
| 4 | 4 | aged at 650° C. | 57 | 98 |
| 4 | 6 | aged at 650° C. | 62 | 91 |
| 4 | 4 | aged at 800° C. | 44 | 93 |
| 4 | 6 | aged at 800° C. | 38 | 91 |

CITED LITERATURE

Figure 1:
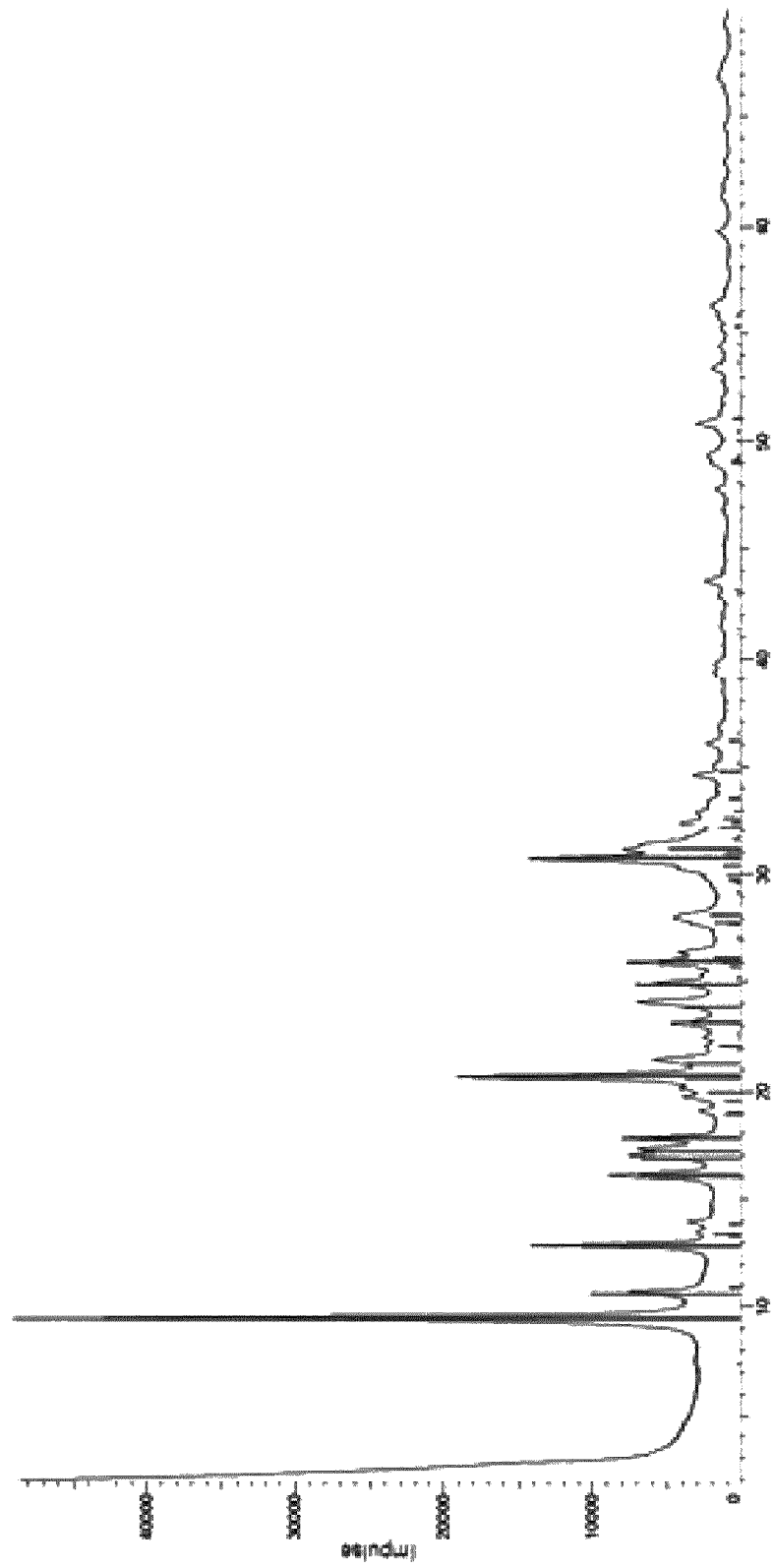
FIG. 1: shows the XRD pattern of the zeolitic material according to Example 1.
Figure 2:
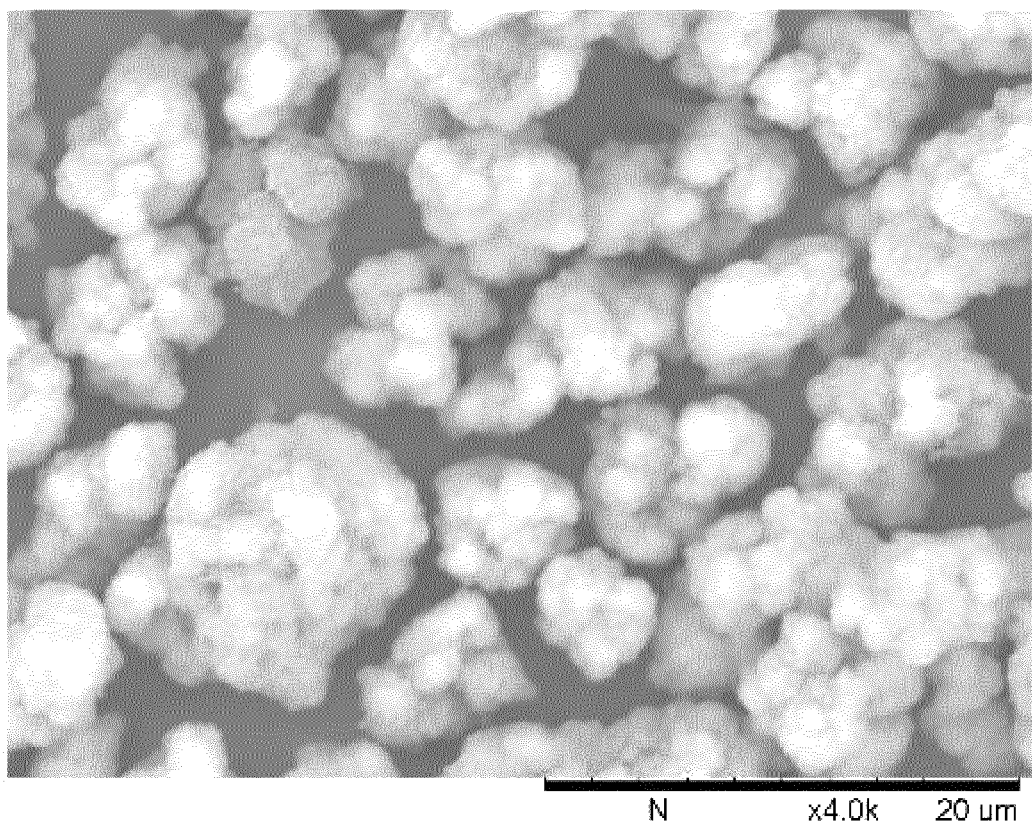
FIG. 2: shows the SEM picture of the zeolitic material according to Example 1.
Figure 3:
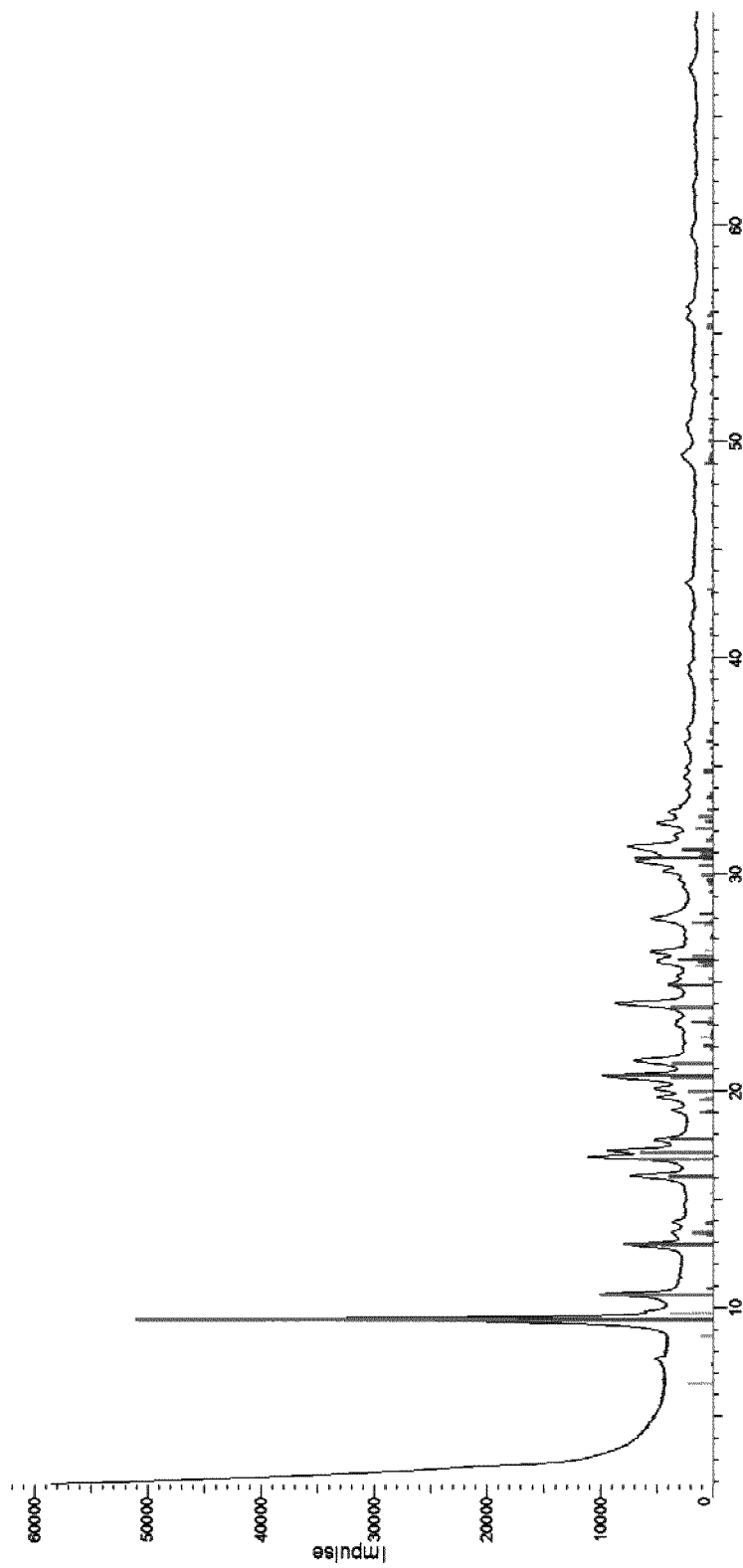
FIG. 3: shows the XRD pattern of the zeolitic material according to Example 2.
Figure 4:
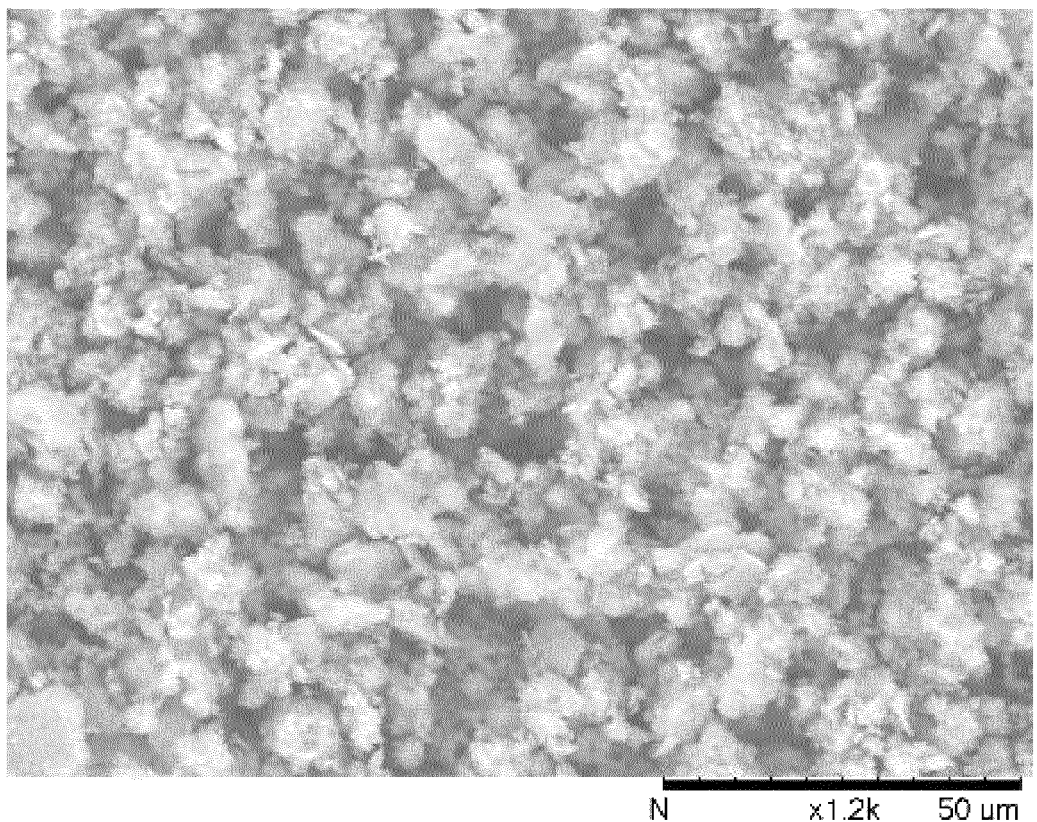
FIG. 4: shows the SEM picture of the zeolitic material according to Example 2.
Figure 5:
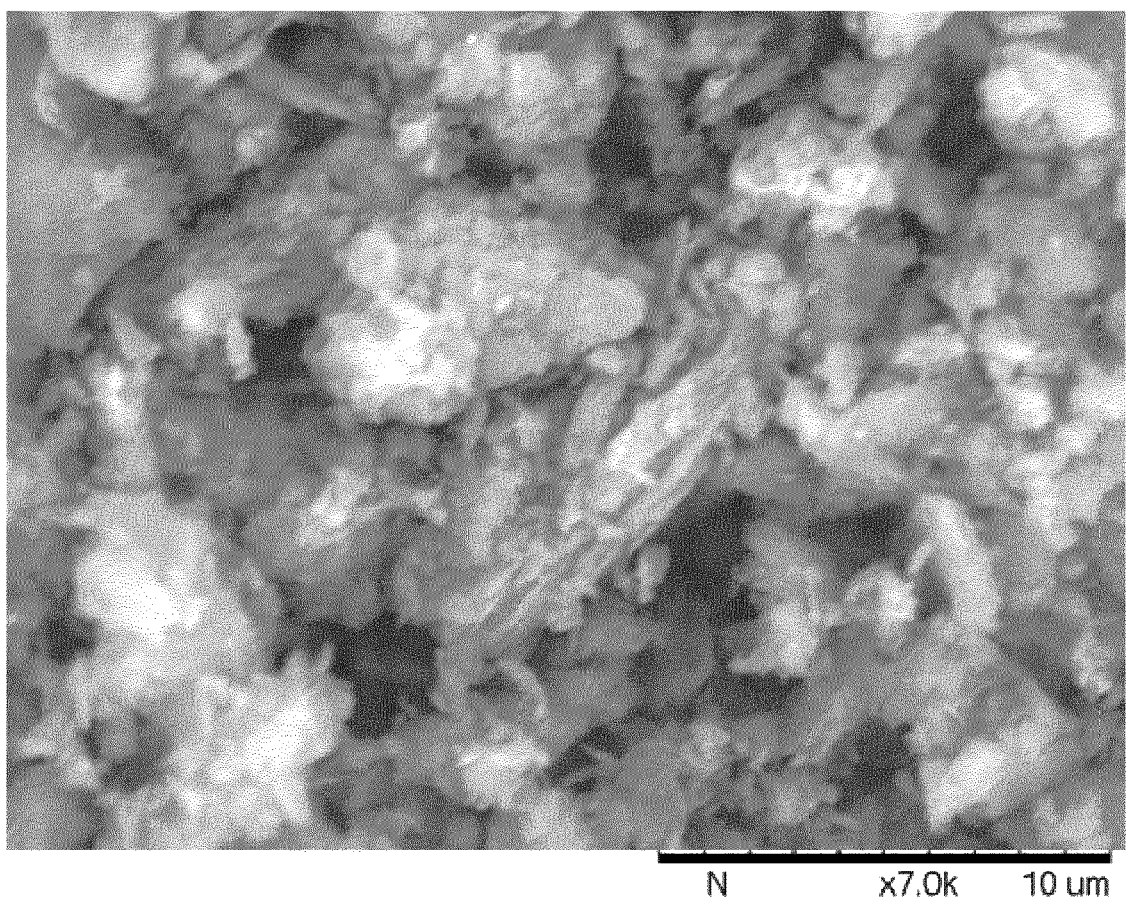
FIG. 5: shows the SEM picture of the natural CHA material provided in Example 2.
Figure 6:
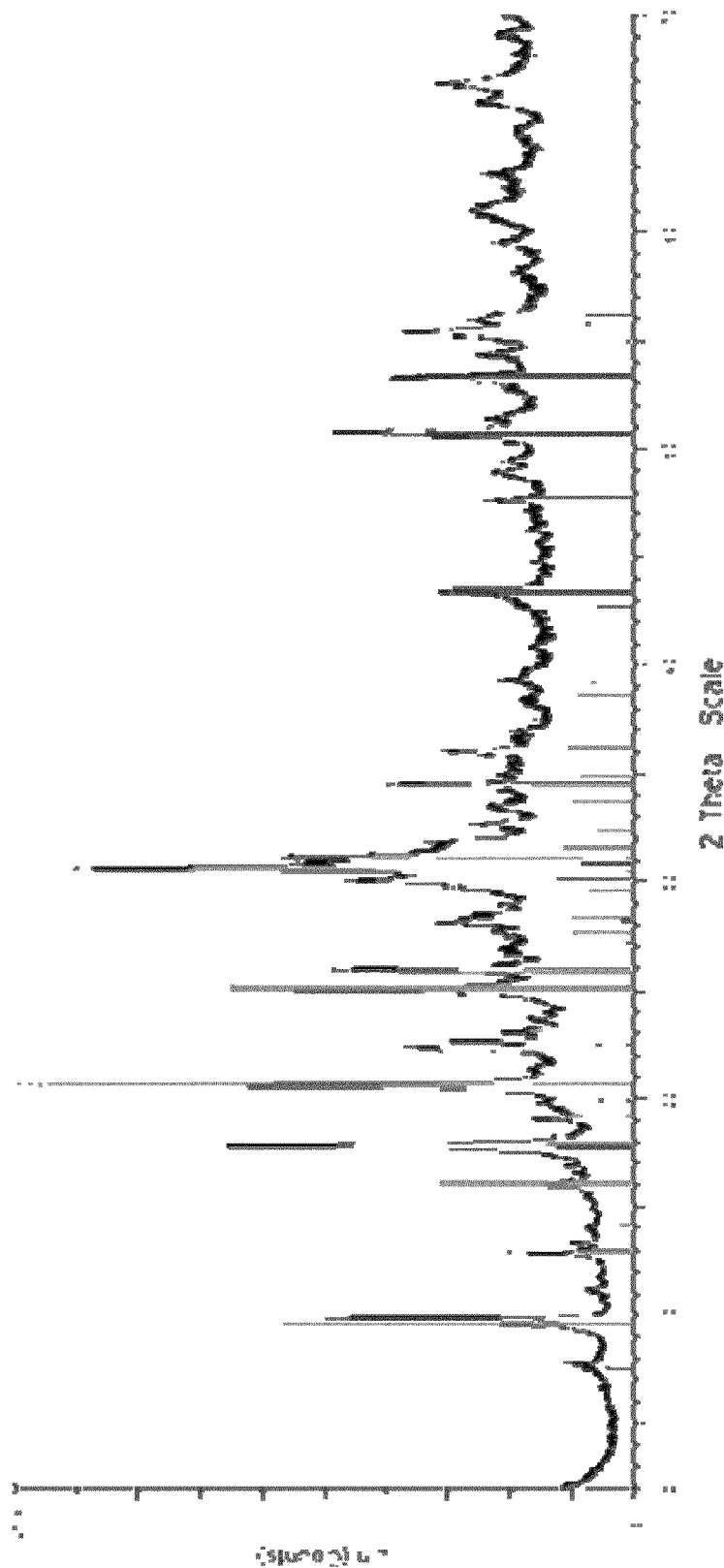
FIG. 6: shows the XRD pattern of the natural CHA material provided in Example 2.
Figure 7:
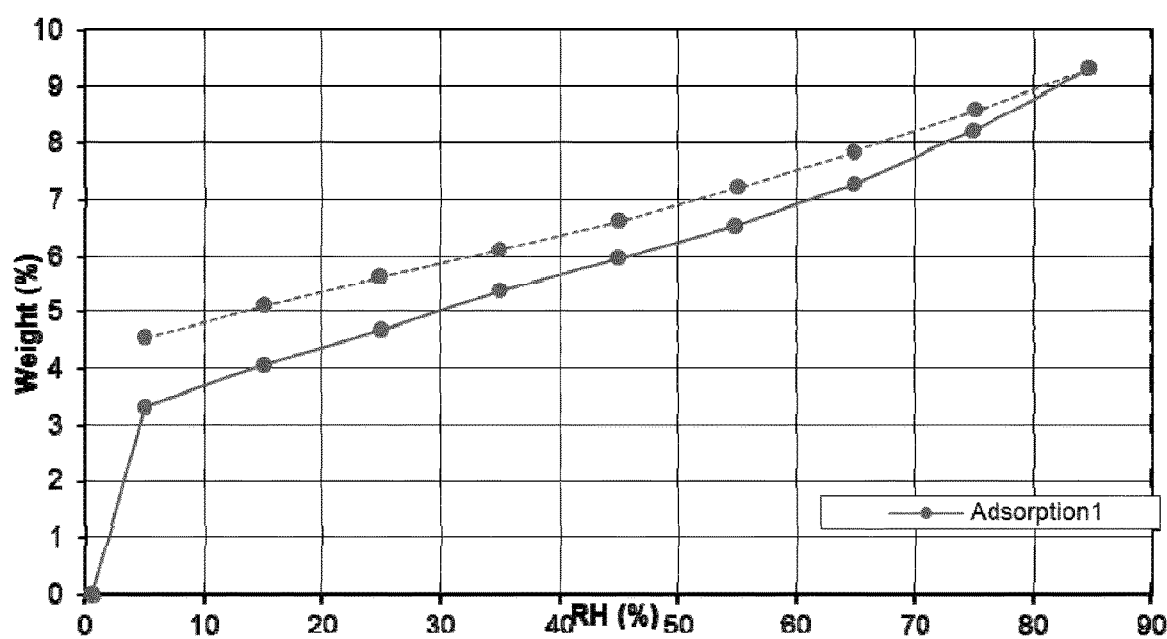
FIG. 7: shows the water uptake isotherm of the natural CHA material provided in Example 2.
Figure 8:
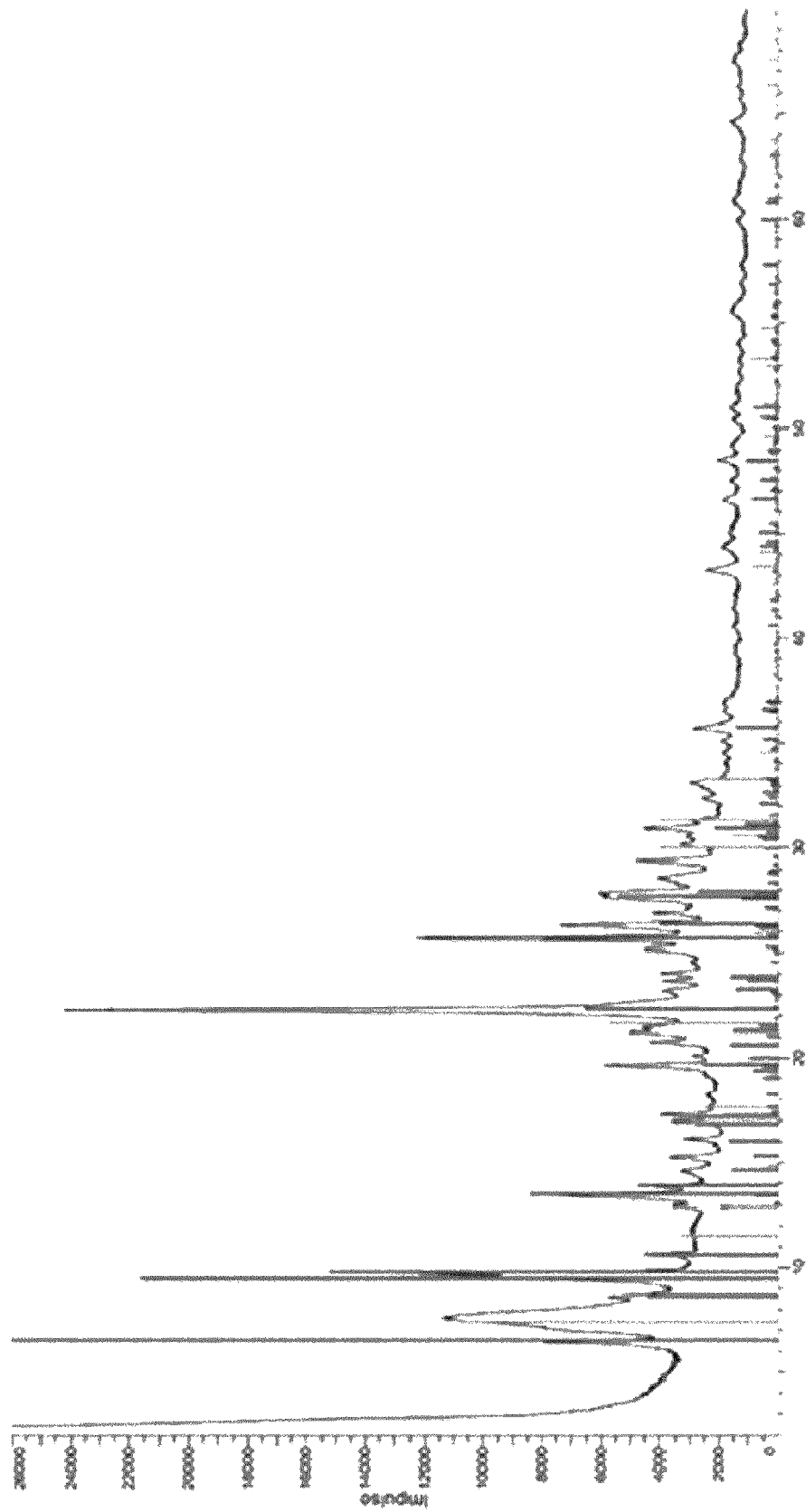
FIG. 8: shows the XRD pattern of the composition obtained according to Comparative Example 3.
Figure 9:
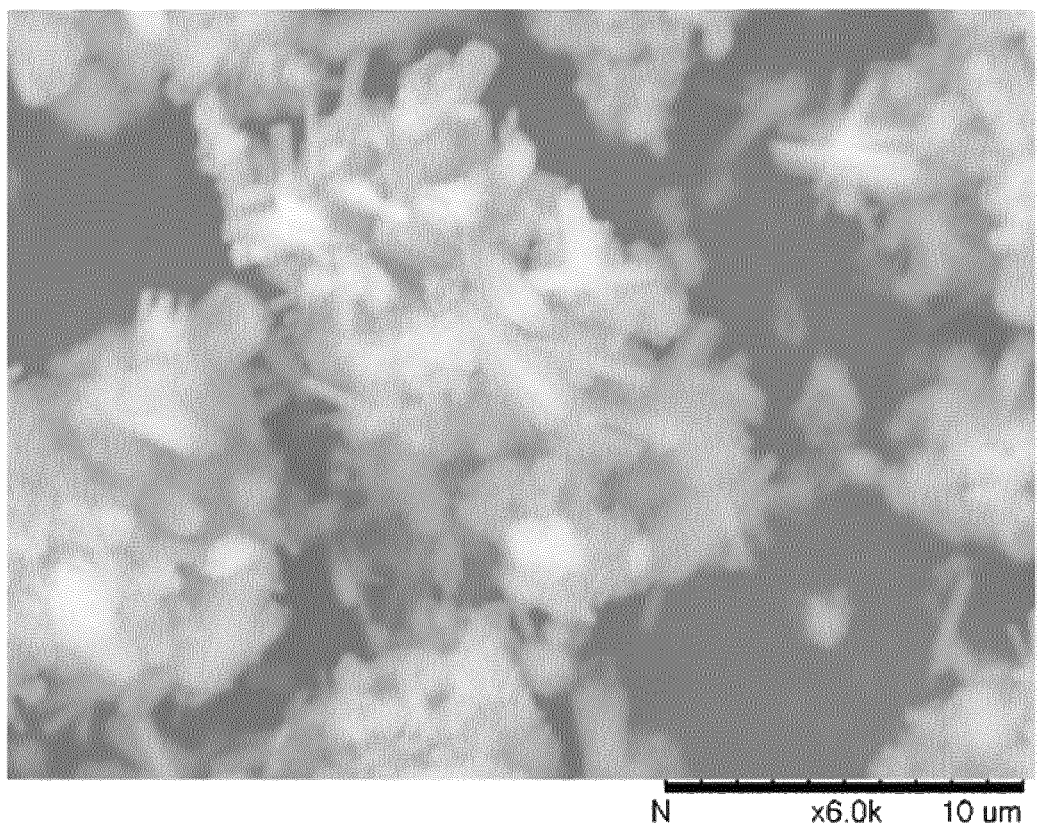
FIG. 9: shows the SEM picture of the composition obtained according to Comparative Example 3.
Figure 10:
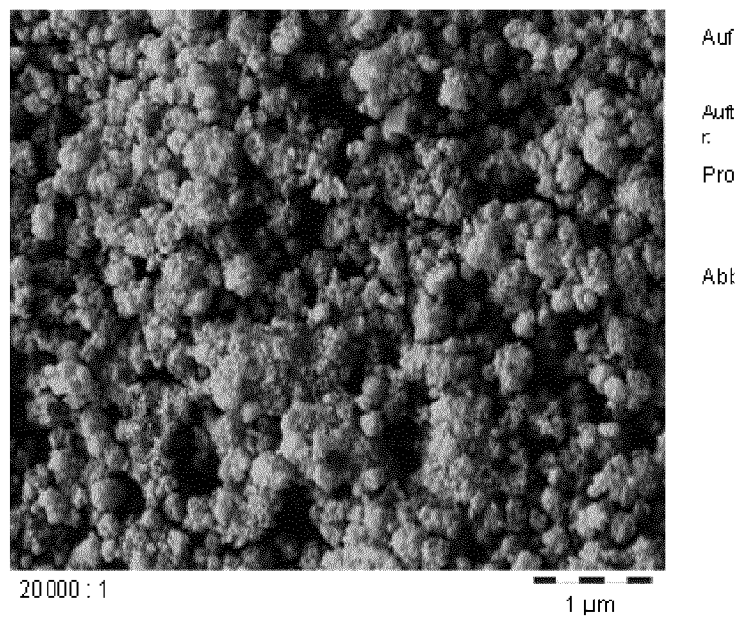
FIG. 10: shows the SEM picture of the zeolitic material provided according to a) in Comparative Example 2.
Figure 11:
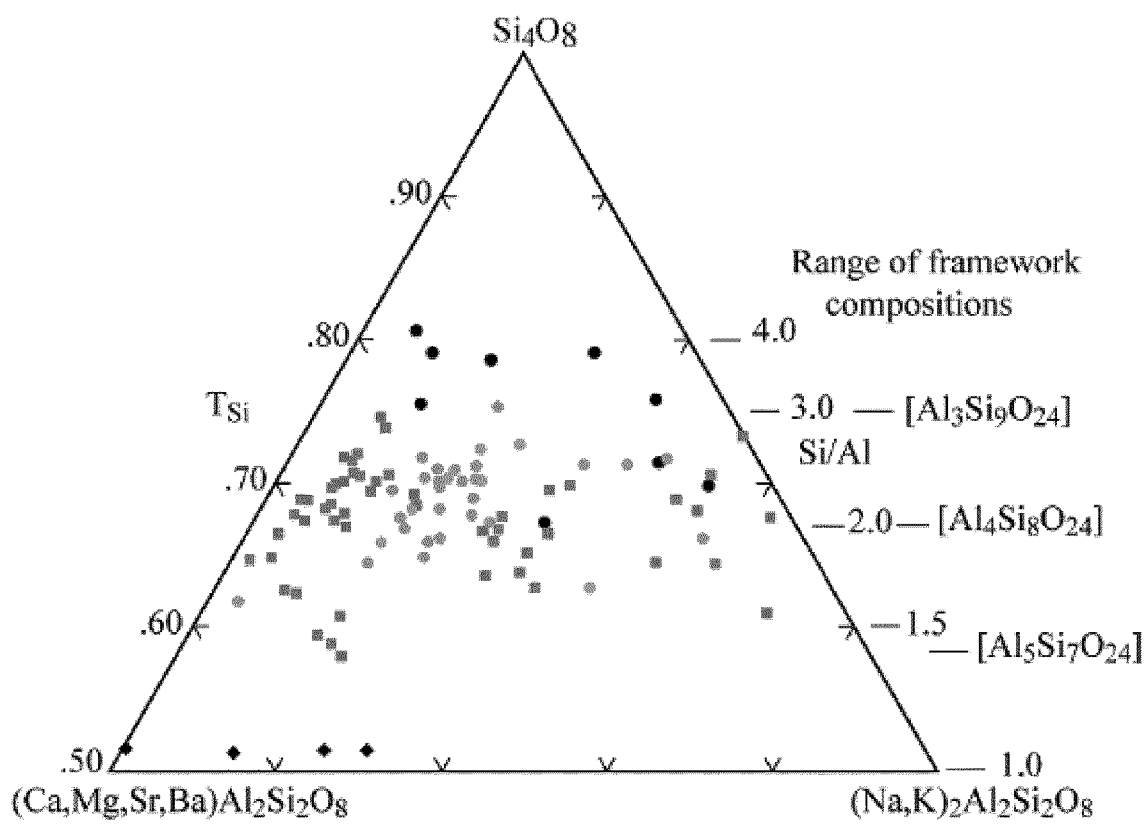
FIG. 11: shows the chemical composition ($R^{2+}$—$R^+$—Si compositional plot) of naturally occurring zeolitic materials, as shown in http://www.iza-online.org/natural/Datasheets/Chabazite/chabazite.htm in section "Chemical composition", status 12 May 2017.
Figure 12:
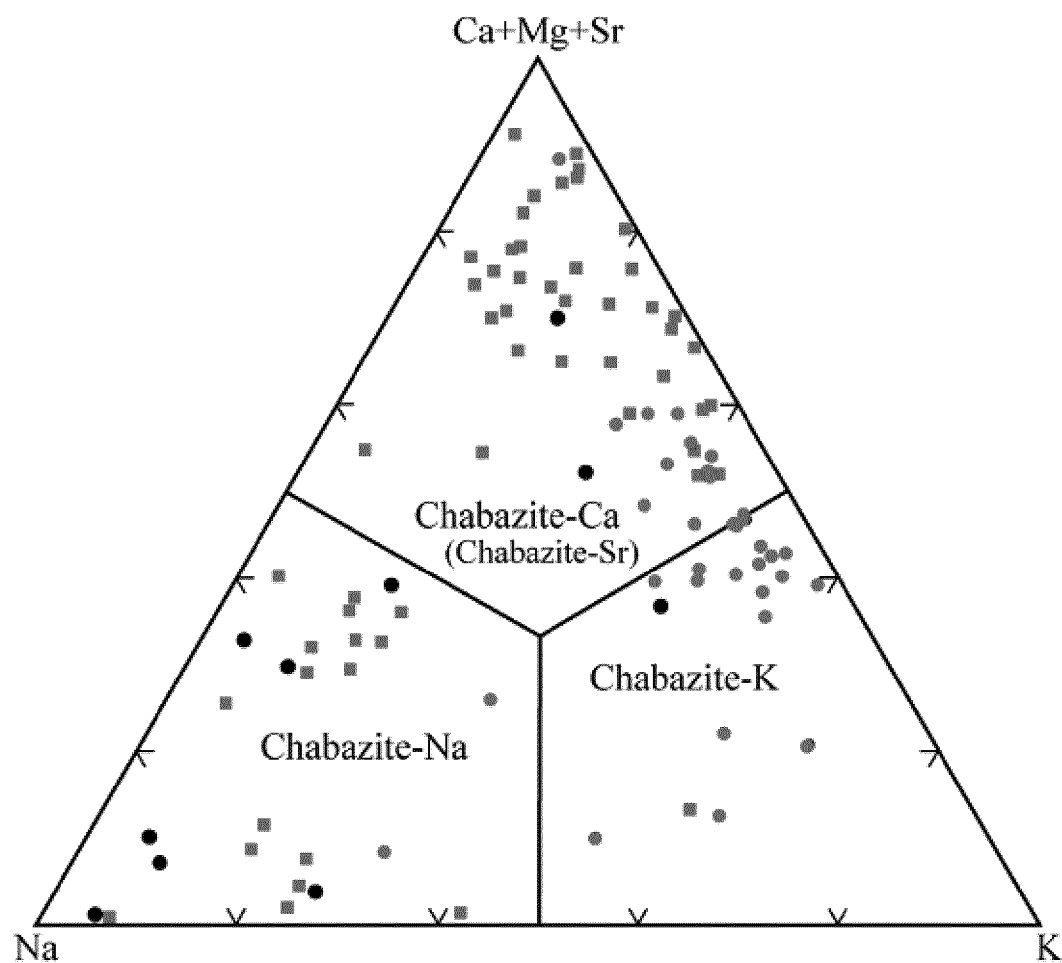
FIG. 12: shows the chemical composition (Na-Cas-K plot) of naturally occurring zeolitic materials, as shown in http://www.iza-online.org/natural/Datasheets/Chabazite/chabazite.htm in section "Chemical composition", status 12 May 2017.

WO 2013/068976 A
Madsen, I. C., Scarlett, N. V. Y. (2008) "Quantitative phase analysis" in: Dinnebier, R. E., Billinge S. J. L. (eds) "Powder diffraction: theory and practice", The Royal Society of Chemistry, Cambridge, pp. 298-331
WO 2013/182974 A

The invention claimed is:

1. A process for preparing a zeolitic material having framework type AEI and having a framework structure which comprises a tetravalent element Y, a trivalent element X, and oxygen, said process comprising
   (i) providing a zeolitic material having framework type CHA and having a framework structure comprising the tetravalent element Y, the trivalent element X, and oxygen;
   (ii) preparing a synthesis mixture comprising the zeolitic material provided in (i), water, a source of the tetravalent element Y other than the zeolitic material provided in (i), and an AEI framework structure directing agent;
   (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
   wherein Y is one or more chosen from Si, Ge, Sn, Ti, and Zr;
   wherein X is one or more chosen from Al, B, Ga, and In; and
   wherein in the framework structure of the zeolitic material provided in (i), the molar ratio Y:X, calculated as $YO_2:X_2O_3$, is at most 20:1;
   wherein said process further comprises
supporting a metal M on the zeolitic material having framework type AEI;
wherein the metal M is a transition metal of groups 7 to 12 of the periodic system of elements.

2. The process of claim 1, wherein Y is Si and X is Al.

3. The process of claim 1, wherein in the framework structure of the zeolitic material provided in (i), the molar ratio Y:X, calculated as $YO_2:X_2O_3$, is in the range of from 3:1 to 20:1.

4. The process of claim 1, wherein Y is Si and the source of the tetravalent element Y according to (ii) comprises one or chosen from a wet-process silica, a dry-process silica, and a colloidal silica; wherein the AEI framework structure directing agent comprises one or more quaternary phosphonium cation containing compounds and/or one or more quaternary ammonium cation containing compounds;
   wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched ($C_1$-$C_6$)alkyl;
   wherein the one or more quaternary ammonium cation containing compounds comprise one or more N,N-dialkyl-dialkylpiperidinium cation containing compounds; and
   wherein the one or more quaternary phosphonium cation containing compounds and/or one or quaternary ammonium cation containing compounds are salts.

5. The process of claim 1, wherein the synthesis mixture prepared in (ii) which is subjected to (iii), the weight ratio of the zeolitic material having framework type CHA relative to the source of the tetravalent element Y, calculated as $YO_2$, is in the range of from 1.0:1 to 3.0:1; wherein the weight ratio of the zeolitic material having framework type CHA relative to the water is in the range of from 0.005:1 to 0.030:1; and wherein the weight ratio of the zeolitic material having framework type CHA relative to the AEI framework structure directing agent is in the range of from 0.1:1 to 0.9:1.

6. The process of claim 1, wherein the synthesis mixture prepared in (ii) which is subjected to (iii) additionally comprises a source of a base.

7. The process of claim 1, wherein the hydrothermal synthesis temperature is in the range of from 110 to 175° C.

8. The process of claim 1, further comprising
   (iv) cooling the mixture obtained from (iii);
   (v) separating the zeolitic material having framework type AEI from the mixture obtained from (iv); and
   (vi) calcining the zeolitic material having framework type AEI obtained from (v).

9. The process of claim 1, wherein supporting a metal M on the zeolitic material having framework type AEI comprises
   (vii.1) preparing a mixture comprising the zeolitic material having framework type AEI, a source of a metal M, a solvent for the source of the metal M, and optionally an acid,
   (vii.2) heating the mixture prepared in (vii.1) to a temperature in the range of from 30 to 90° C.;
   (vii.3) optionally cooling, the mixture obtained from (vii.2);
   (vii.4) separating the zeolitic material having framework type AEI comprising the metal M from the mixture obtained from (2) or (vii.3);
   (vii.5) optionally drying the zeolitic material having framework type AEI comprising the metal M obtained from (vii.4) in a gas atmosphere; and
   (vii.6) optionally calcining the zeolitic material having framework type AEI comprising the metal M obtained from (vii.4) or (vii.5) in a gas atmosphere.

10. The process of claim 1, wherein in (vii), the metal M is supported on the zeolitic material having framework type AEI in an amount in the range of from 0.1 to 5 weight-%, calculated as elemental M and based on the total weight of the zeolitic material having framework type AEI.

11. A zeolitic material having framework type AEI and having a framework structure which comprises a tetravalent element Y, a trivalent element X, and oxygen, and a metal M, obtained by the process according to claim 1, said zeolitic material having framework type AEI having a total amount of acid sites in the range of from 1.0 to 2.0 mmol/g, wherein the total amount of acid sites is defined as the total molar amount of desorbed ammonia per mass of the zeolitic material having framework type AEI determined according to the temperature programmed desorption of ammonia; wherein the zeolitic material having framework type AEI has an amount of medium acid sites in the range of from 0.1 to 0.8 mmol/g, wherein the amount of medium acid sites is defined as the amount of desorbed ammonia per mass of the zeolitic material having framework type AEI determined according to the temperature programmed desorption of ammonia in the temperature range of from 250 to 500° C.

12. A catalyst comprising the zeolitic material having framework type AEI according to claim 11.

13. A method of selective catalytic reduction of nitrogen oxides in an exhaust gas stream, comprising contacting the exhaust gas stream with the catalyst of claim 12.

14. The method of claim 12, comprising the conversion of a C1 compound to one or more olefins.

* * * * *